US011231440B2

(12) United States Patent
Liu et al.

(10) Patent No.: US 11,231,440 B2
(45) Date of Patent: Jan. 25, 2022

(54) ACCELERATION SENSOR, CAPACITANCE DETECTION CIRCUIT AND METHOD, ACCELERATION PROCESSING CIRCUIT AND METHOD, STORAGE MEDIUM AND ELECTRONIC DEVICE

(71) Applicants: Hefei BOE Optoelectronics Technology Co., Ltd., Hefei (CN); BOE Technology Group Co., Ltd., Beijing (CN)

(72) Inventors: Youhui Liu, Beijing (CN); Na Zhang, Beijing (CN); Peng Li, Beijing (CN); Lele Han, Beijing (CN); Zhengwei Zhu, Beijing (CN)

(73) Assignees: Hefei BOE Optoelectronics Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 208 days.

(21) Appl. No.: 16/463,124

(22) PCT Filed: Oct. 26, 2018

(86) PCT No.: PCT/CN2018/112178
§ 371 (c)(1),
(2) Date: May 22, 2019

(87) PCT Pub. No.: WO2019/174243
PCT Pub. Date: Sep. 19, 2019

(65) Prior Publication Data
US 2021/0109123 A1 Apr. 15, 2021

(30) Foreign Application Priority Data
Mar. 14, 2018 (CN) .......................... 201810208512.5

(51) Int. Cl.
*G01P 15/125* (2006.01)
*G01P 1/00* (2006.01)

(52) U.S. Cl.
CPC .............. *G01P 15/125* (2013.01); *G01P 1/00* (2013.01)

(58) Field of Classification Search
CPC .. G01P 1/00; G01P 15/125; G01P 2015/0814; G01P 2015/0865
See application file for complete search history.

(56) References Cited

U.S. PATENT DOCUMENTS 3,482,453 A    12/1969  Clarke
5,349,855 A *  9/1994  Bernstein ........... G01C 19/5719
                                                      73/504.16
(Continued)

FOREIGN PATENT DOCUMENTS

CN    1389704 A    1/2003
CN    1535372 A    10/2004
(Continued)

OTHER PUBLICATIONS

Feb. 11, 2019—(WO) International Search Report and Written Opinion Appn PCT/CN2018/112178 and English Translation.
(Continued)

*Primary Examiner* — David J Bolduc
(74) *Attorney, Agent, or Firm* — Banner & Witcoff, Ltd.

(57) ABSTRACT

An acceleration sensor, a capacitance detection circuit and method, an acceleration processing circuit and method, a storage medium and an electronic device are provided. The acceleration sensor includes: a base, at least one fixed electrode fastened on the base, and at least one mass movable relative to the fixed electrode. The mass includes a conductive electrode, the conductive electrode and the fixed electrode are configured to form a capacitor, and a capaci-
(Continued)

tance value of the capacitor is variable due to movement of the mass relative to the base.

12 Claims, 15 Drawing Sheets

(56) References Cited

U.S. PATENT DOCUMENTS

| | | | |
|---|---|---|---|
| 5,473,945 A * | 12/1995 | Grieff | G01C 19/5719 73/504.04 |
| 5,914,553 A * | 6/1999 | Adams | G01P 15/0891 310/309 |
| 5,986,497 A * | 11/1999 | Tsugai | G01D 5/24 327/554 |
| 6,278,283 B1 | 8/2001 | Tsugai | |
| 8,169,238 B1 | 5/2012 | Maharyta et al. | |
| 10,775,526 B2 * | 9/2020 | Takahashi | H03K 5/1252 |
| 10,788,380 B2 * | 9/2020 | Feng | H03F 3/45475 |
| 2001/0045127 A1 * | 11/2001 | Chida | G01C 19/5719 73/504.12 |
| 2001/0045128 A1 * | 11/2001 | McCall | G01C 21/16 73/511 |
| 2002/0107658 A1 * | 8/2002 | McCall | G01P 15/125 702/141 |
| 2002/0180462 A1 | 12/2002 | Hartwell et al. | |
| 2004/0017209 A1 * | 1/2004 | Goto | G01R 27/2605 324/661 |
| 2004/0183551 A1 * | 9/2004 | Itakura | G01P 15/125 324/663 |
| 2005/0077909 A1 | 4/2005 | Lalla | |
| 2006/0213270 A1 * | 9/2006 | O'Dowd | H03M 3/34 73/514.32 |
| 2007/0163324 A1 * | 7/2007 | McMahan | G01D 3/08 73/1.38 |
| 2007/0251294 A1 | 11/2007 | Tanaka et al. | |
| 2010/0000324 A1 * | 1/2010 | Yoshikawa | G01P 15/0802 73/514.32 |
| 2010/0219848 A1 * | 9/2010 | Gotoh | G01H 11/06 324/686 |
| 2010/0259285 A1 * | 10/2010 | Koli | G01P 15/125 324/686 |
| 2011/0018561 A1 * | 1/2011 | Hartwell | G01P 3/483 324/686 |
| 2011/0056296 A1 * | 3/2011 | Kanemoto | G01P 15/0802 73/514.32 |
| 2011/0100126 A1 * | 5/2011 | Jeong | G01P 15/125 73/514.32 |
| 2011/0115038 A1 * | 5/2011 | Kanemoto | G01P 15/125 257/418 |
| 2012/0048019 A1 | 3/2012 | Zhou et al. | |
| 2012/0125105 A1 * | 5/2012 | Hirano | G01P 15/097 73/514.32 |
| 2012/0293907 A1 * | 11/2012 | Jin | G01C 19/5755 361/280 |
| 2015/0301075 A1 * | 10/2015 | Yamanaka | B81B 3/0072 73/1.38 |
| 2015/0377622 A1 * | 12/2015 | Waters | G01C 19/5726 73/504.12 |
| 2016/0320211 A1 * | 11/2016 | Okami | G01P 15/125 |
| 2018/0364275 A1 * | 12/2018 | Tao | G01D 5/24 |

FOREIGN PATENT DOCUMENTS

| | | |
|---|---|---|
| CN | 101576570 A | 11/2009 |
| CN | 201749127 U | 2/2011 |
| CN | 205139171 U | 4/2016 |
| JP | H10300775 A | 11/1998 |

OTHER PUBLICATIONS

Nov. 5, 2021—(EP) Extended European Search Report Appn 18877296.6.

* cited by examiner

US 11,231,440 B2

ACCELERATION SENSOR, CAPACITANCE DETECTION CIRCUIT AND METHOD, ACCELERATION PROCESSING CIRCUIT AND METHOD, STORAGE MEDIUM AND ELECTRONIC DEVICE

The application is a U.S. National Phase Entry of International Application No. PCT/CN2018/112178 filed on Oct. 26, 2018, designating the United States of America and claiming priority to Chinese Patent Application No. 201810208512.5, filed on Mar. 14, 2018. The present application claims priority to and the benefit of the above-identified applications and the above-identified applications are incorporated by reference herein in their entirety.

TECHNICAL FIELD

Embodiments of the present disclosure relate to an acceleration sensor, a capacitance detection circuit and method, an acceleration processing circuit and method, a storage medium and an electronic device.

BACKGROUND

Acceleration sensors are widely used in fields such as aircraft control, automobile safety and the like, due to the characteristics of small volume, light weight, convenience and flexibility, and the like.

Types of acceleration sensors are piezoresistive, piezoelectric, resonant, tunnel-current, capacitive, etc. Capacitive acceleration micro-sensors have advantages of simple structure, stable output, small temperature drift and easy test and integration, which helps to large-scale production.

SUMMARY

At least one embodiment of the present disclosure provides an acceleration sensor, which includes: a base, a fixed electrode fastened on the base, and a mass movable relative to the fixed electrode; and the mass includes a conductive electrode, the conductive electrode and the fixed electrode are configured to form a capacitor, and a capacitance of the capacitor is variable due to movement of the mass relative to the base.

For example, in some embodiments, the acceleration sensor further includes a dielectric layer between the conductive electrode and the fixed electrode.

For example, in some embodiments, the acceleration sensor further includes a cantilever beam on the base, and the mass is connected to the cantilever beam.

For example, in some embodiments, a terminal of the cantilever beam is connected to the base, and another terminal of the cantilever beam is connected to the mass.

For example, in some embodiments, the cantilever beam includes a spring.

For example, in some embodiments, a capacitance value of the capacitor and an acceleration measured by the acceleration sensor are in a linear relationship.

For example, in some embodiments, the acceleration sensor includes a plurality of fixed electrodes, and the plurality of fixed electrodes are arranged with intervals on the base.

For example, in some embodiments, the plurality of fixed electrodes are arranged in parallel along a movement direction of the mass relative to the base.

At least one embodiment of the present disclosure further provides a capacitance detection circuit for monitoring a capacitance value of the capacitor of the acceleration sensor described above, which includes a first capacitor and a detection sub-circuit, and two terminals of the first capacitor are electrically connected to the fixed electrode and the conductive electrode of the acceleration sensor, respectively; and the detection sub-circuit is configured to convert a capacitance value of the first capacitor into a detection signal and output the detection signal.

For example, in some embodiments, the detection sub-circuit comprises: a first switch, a second switch, a third switch, a second capacitor, a resistor, a generation sub-circuit and a storage sub-circuit; the first capacitor is configured to: charge in response to a case where the first switch is turned on, and discharge in response to a case where the first switch is turned off and the second switch and the third switch both are turned on, and charge the second capacitor; the generation sub-circuit is configured to generate the detection signal according to a voltage of the second capacitor and a reference voltage, and the detection signal generated is at a first level in a case where the voltage of the second capacitor is lower than the reference voltage, and the detection signal generated is at a second level in a case where the voltage of the second capacitor is not lower than the reference voltage; the second capacitor is configured to discharge through the resistor in response to a case where the detection signal is at the second level; and the storage sub-circuit is configured to buffer and output the detection signal.

For example, in some embodiments, the detection sub-circuit further comprises: a first inverter, which is configured to invert a clock signal input from a clock signal terminal and output an inversion signal of the clock signal to a control electrode of the first switch, and a second inverter, which is configured to invert the detection signal and output an inversion signal of the detection signal to a control electrode of the third switch, so that the third switch is turned on in a case where the detection signal is at the first level.

For example, in some embodiments, the detection sub-circuit further comprises a fourth switch, which is configured to be turned on in response to the case where the detection signal is at the second level, so that the second capacitor discharges through the resistor.

For example, in some embodiments, an input terminal of the first inverter is connected to the clock signal terminal, and an output terminal of the first inverter is connected to the control electrode of the first switch; an input terminal of the second inverter is connected to an output terminal of the generation sub-circuit, and an output terminal of the second inverter is connected to the control electrode of the third switch; a first electrode of the first switch is connected to a first power supply terminal for receiving an first voltage that is input, and a second electrode of the first switch is connected to a first terminal of the first capacitor; a second terminal of the first capacitor is grounded; a control electrode of the second switch is connected to the clock signal terminal for receiving the clock signal, a first electrode of the second switch is connected to the first terminal of the first capacitor, and a second electrode of the second switch is connected to a first terminal of the second capacitor; a first electrode of the third switch is connected to a second terminal of the second capacitor, and a second electrode of the third switch is connected to the second terminal of the first capacitor; and a control electrode of the fourth switch is connected to the output terminal of the generation sub-circuit, a first electrode of the fourth switch is connected to a first terminal of the resistor, and a second electrode of the fourth switch is connected to the second terminal of the second capacitor.

For example, in some embodiments, the generation sub-circuit comprises a comparator; and a non-inverting input terminal of the comparator is respectively connected to the first terminal of the second capacitor and a second terminal of the resistor, an inverting input terminal of the comparator is connected to a reference voltage terminal for receiving the reference voltage, and an output terminal of the comparator is connected to the input terminal of the second inverter.

For example, in some embodiments, the storage sub-circuit comprises a latch, and an input terminal of the latch is connected to an output terminal of the generation sub-circuit.

For example, in some embodiments, the detection signal comprises a square wave signal, and a number of pulses of the square wave signal and an acceleration of the acceleration sensor are in a linear relationship.

At least one embodiment of the present disclosure further provides a capacitance detection method for the capacitance detection circuit described above, which comprises: charging the first capacitor; repeating operations of charging and discharging until electric charges of the first capacitor are discharged completely, in which the operations of charging and discharging comprise: charging a second capacitor by discharging the first capacitor, and discharging the second capacitor; generating the detection signal according to a voltage of the second capacitor and a reference voltage, in which the detection signal generated is at a first level in a case where the voltage of the second capacitor is lower than the reference voltage, and the detection signal generated is at a second level in a case where the voltage of the second capacitor is not lower than the reference voltage; and buffering and outputting the detection signal.

At least one embodiment of the present disclosure further provides an acceleration processing circuit, which comprises the capacitance detection circuit described above, an acceleration calculation sub-circuit, and a processing sub-circuit; the capacitance detection circuit is configured to output the detection signal to the acceleration calculation sub-circuit; the acceleration calculation sub-circuit is configured to calculate a correlation parameter value of an acceleration according to the detection signal; and the processing sub-circuit is configured to perform an operation corresponding to the correlation parameter value of the acceleration, according to the correlation parameter value of the acceleration.

For example, in some embodiments, the correlation parameter value and an acceleration measured by the acceleration sensor are in a linear relationship.

For example, in some embodiments, the detection signal comprises a square wave signal, and the correlation parameter value comprises a number of pulses of the square wave signal.

For example, in some embodiments, the processing sub-circuit is configured to perform the operation in a case where the number of the pulses of the square wave signal is less than a preset threshold value.

For example, in some embodiments, the operation comprises: opening an airbag, dialing an alarm phone, sending out a prompt message or generating a warning signal.

At least one embodiment of the present disclosure further provides an acceleration processing method for the acceleration processing circuit described above, which comprises: monitoring the capacitor in the acceleration sensor and converting a monitoring result into the detection signal; calculating the correlation parameter value of the acceleration according to the detection signal; and performing the operation corresponding to the correlation parameter value of the acceleration, according to the correlation parameter value of the acceleration.

For example, in some embodiments, the detection signal comprises a square wave signal; calculating the correlation parameter value of the acceleration according to the detection signal comprises: counting a number of pulses of the square wave signal during a predetermined time period; and performing the operation corresponding to the correlation parameter value of the acceleration, according to the correlation parameter value of the acceleration, comprises: determining whether the number of the pulses is less than a preset threshold value, and performing the operation in a case where the number of the pulses is less than the preset threshold value.

At least one embodiment of the present disclosure further provides a storage medium on which a computer instruction is stored, and one or more steps of the acceleration processing method described above are performed in a case where the computer instruction is executed by a processor.

At least one embodiment of the present disclosure further provides an electronic device, which comprises one or more processors, and the processors are configured to execute a computer instruction for performing one or more steps of the acceleration processing method described above.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative to the disclosure.

DETAILED DESCRIPTION

Figure 1:
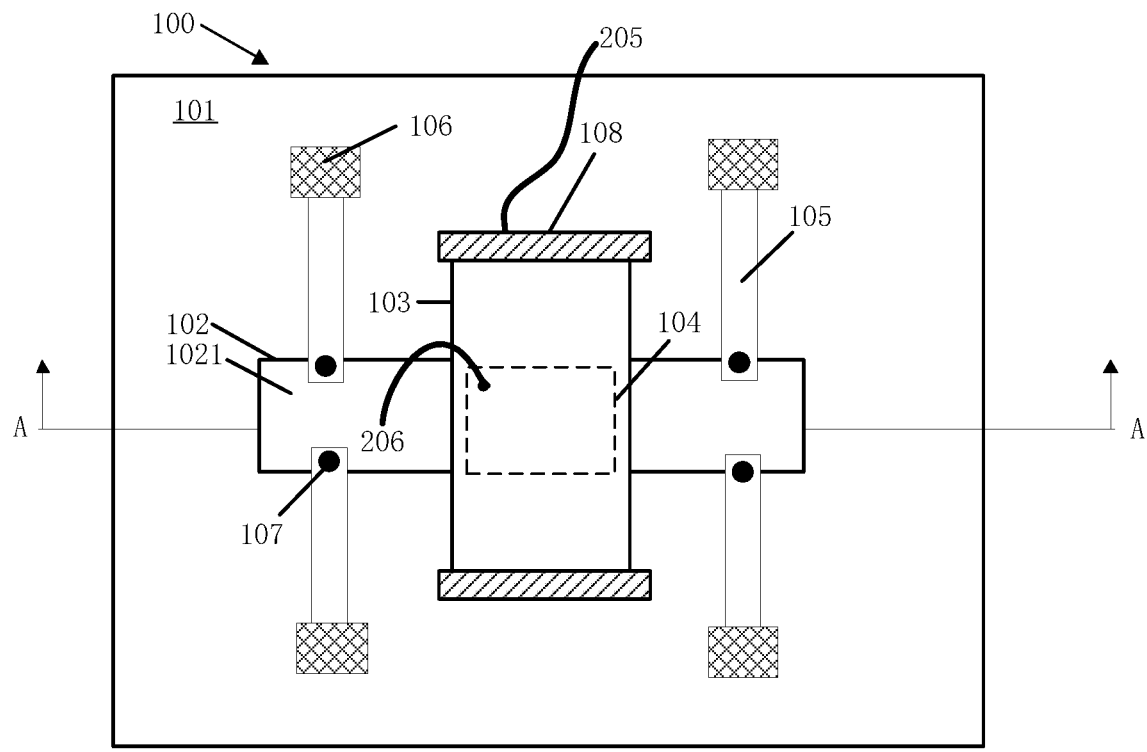
FIG. 1 is a first top view of an acceleration sensor provided by some embodiments of the present disclosure.

The technical solutions of embodiments of the present disclosure will be described in a clearly and fully understandable way in connection with the drawings, and example embodiments of the present disclosure and various features and advantageous details thereof will be described more fully with reference to non-limiting example embodiments illustrated in the drawings and described in detail in the following description. It should be noted that the features illustrated in the drawings are not necessarily drawn to scale. The examples given are only intended to facilitate understanding of implementations of the embodiments of the present disclosure and to further enable those skilled in the art to implement the example embodiments. Therefore, these examples should not be construed as limiting the scope of the embodiments of the present disclosure.

Unless otherwise defined, all the technical and scientific terms used herein have the same meanings as commonly understood by those of ordinary skill in the art to which the present disclosure belongs. The terms "first," "second," etc., which are used in the description and the claims of the present disclosure, are not intended to indicate any sequence, amount or importance, but used to distinguish various components. Furthermore, in various embodiments of the present disclosure, the same or similar reference numerals refer to the same or similar components. Adjacent layers in the examples of the present disclosure are not necessarily in close contact, and there may be a certain interval.

In related technologies, an interdigital capacitance sensor is a common micro-electromechanical system (MEMS) acceleration sensor. The interdigital MEMS acceleration sensor includes a movable detection mass block on which a plurality of interdigitated finger structures are provided to improve a sensitivity of the acceleration sensor. However, the finger structures occupies a large space, which is unfavorable for miniaturization of size and integration of devices. In addition, in the interdigital MEMS acceleration sensor, since a capacitance is inversely proportional to a distance between fingers, they are in a nonlinear relationship, which is not convenient for calculation and processing of data. The interdigital MEMS acceleration sensor is sensitive to the distance between the fingers, and in environments with different temperatures, since the phenomenon, i.e., expansion caused by heat and contraction caused by cold, occurs on electrodes inevitably, calculation results having a certain deviation may be caused. That is, in different environmental temperatures, such as in different seasons and different regions, detection results of the interdigital MEMS acceleration sensor for a same acceleration magnitude are different and are greatly affected by temperatures.

The embodiments of the present disclosure provide an acceleration sensor, a capacitance detection circuit and method, an acceleration processing circuit and method, a storage medium and an electronic device. The acceleration sensor, the capacitance detection circuit and the acceleration processing circuit of the embodiments of the present disclosure can be applied to scenes requiring acceleration detections.

The embodiments of the present disclosure convert a sensed acceleration into a capacitance value of a capacitor through the acceleration sensor, and the capacitance value of the capacitor converted by the acceleration sensor of the embodiments of the present disclosure and the sensed acceleration satisfy a linear relationship, which thus facilitates calculation, processing and monitoring of data. In addition, the acceleration sensor of the embodiments of the present disclosure is small in volume, convenient to integrate, and hardly affected by temperatures due to absence of interdigital structures. The embodiments of the present disclosure further convert the capacitance value of the capacitor sensed by the acceleration sensor into a detection signal (e.g., a square wave signal) convenient for detection and statistics through the capacitance detection circuit, so that the capacitance value of the capacitor can be quickly and sensitively monitored. The acceleration processing circuit of the embodiments of the present disclosure can also control means of transportation such as cars to perform safety measures according to the detection signal output by the capacitance detection circuit, thereby protection of personal safety of drivers and passengers is implemented.

For example, the acceleration sensor, the capacitance detection circuit, and the acceleration processing circuit of the embodiments of the present disclosure may be applied to acceleration detections in a case where a vehicle collides at a high speed. For example, the acceleration sensor provided by the embodiments of the present disclosure converts the acceleration of the vehicle into the capacitance value of the capacitor that satisfies a linear relationship with the acceleration, then the capacitance detection circuit monitors the capacitance value of the capacitor, and converts a monitored result into a detection signal (e.g., a square wave signal) which is convenient to be processed, and finally the acceleration processing circuit determines whether the vehicle is collided and the severity of the collision according to the detection signal.

In some embodiments, in a case where the collision is not serious (e.g., the acceleration a obtained by detecting the capacitance value is less than a certain preset threshold value), safety protection measures (e.g., the safety protection measures include an airbag) are not activated.

In other embodiments, in a case where the collision is serious (e.g., the acceleration obtained by detecting the capacitance value is greater than a certain preset threshold value), the safety protection measures need to be activated (e.g., the airbag is activated). For example, the capacitance detection circuit may send a detection signal (e.g., a square wave signal) to an acceleration calculation sub-circuit and a processing sub-circuit, and then the acceleration calculation sub-circuit and the processing sub-circuit quickly determine whether the vehicle is collided and whether the safety protection measures should be activated (e.g., the airbag should be activated) according to the detection signal. In a case where it is determined that the vehicle has suffered a serious collision, an on-board electronic control unit ECU sends a command to an igniter, and the igniter ignites in response to the command. Subsequently, a gas generator generates a large amount of gas (e.g., nitrogen ($N_2$)) and outputs $N_2$ to the airbag to protect personal safety of passengers. An acceleration sensor 100 of the embodiments of the present disclosure is introduced below with reference to FIGS. 1-7B.

As illustrated in FIG. 1, an embodiment of the present disclosure provides an acceleration sensor 100, which may include: a base 101, a fixed electrode 103 fastened on the base 101, and a mass 102 movable relative to the fixed electrode 103. The mass 102 includes a moving member 1021 and a conductive electrode 104 on the moving member 1021. The conductive electrode 104 and the fixed electrode 103 are configured to form a capacitor, and a capacitance value of the capacitor is variable due to movement of the mass 102 relative to the base 101. For example, an overlapping area of an orthographic projection of the conductive electrode 104 and an orthographic projection of the fixed electrode 103 is variable. For example, the orthographic projection of the fixed electrode 103 is a projection of the fixed electrode 103 on a surface of the base 101 along a direction perpendicular to the base 101, and the orthographic projection of the conductive electrode 104 is a projection of the conductive electrode 104 on the surface of the base 101 along the direction perpendicular to the base 101. In some examples, the fixed electrode 103 is above or below the conductive electrode 104, and the orthographic projection of the fixed electrode 103 and the orthographic projection of the conductive electrode 104 overlap with each other, and the overlapping area may change due to relative movement of the mass 102 and the base 101 as the acceleration sensor 100 moves. Referring to FIG. 1, it can be known that the conductive electrode 104 and the fixed electrode 103 overlap in the direction perpendicular to the surface of the base 101, and the overlapping area is variable. The conductive electrode 104 and the fixed electrode 103 are configured to form a capacitor. The acceleration sensor 100 is small in volume and convenient to integrate, and is hardly affected by temperatures due to absence of interdigital structures.

In some embodiments, the base 101 may be a horizontally placed substrate (e.g., the substrate is horizontally fixed in a motor vehicle), and accordingly, the acceleration sensor 100 is used to sense an acceleration in a horizontal direction. In this way, the conductive electrode 104 and the fixed electrode 103 overlap in a vertical direction and form an overlapping area. For example, the overlapping area may include a rectangular region where the conductive electrode 104 is located as illustrated by the dashed block in FIG. 1.

It should be illustrated that the embodiments of the present disclosure do not limit a placement direction of the base 101. For example, the placement direction of the base 101 may be determined according to a direction of an acceleration requiring to be detected.

As illustrated in FIG. 1, in some examples, the moving member 1021 includes a rectangular region in which a conductive layer corresponding to the conductive electrode 104 is provided. For example, the rectangular region may include: a part of an orthographic projection of the fixed electrode 103 on a surface of the moving member 1021 in a case where the acceleration is 0, and the part of the orthographic projection coincides with the moving member 1021. For example, the moving member 1021 may be partly composed of a thicker silicon single crystal substrate.

It should be illustrated that the embodiments of the present disclosure do not limit specific arrangements of the moving member 1021 and the conductive electrode 104 in the mass 102. For example, in some examples, the conductive electrode 104 is a separate conductive member and is fixed to the moving member 1021 which is made of an insulating material. For example, in other examples, the conductive electrode 104 is embedded on the moving member 1021, that is, the conductive electrode 104 is integrally formed with or is part of the moving member 1021 which is made of a conductive material. The moving member 1021 and the conductive electrode 104 may also adopt other suitable arrangements, and the embodiments of the present disclosure are not limited thereto.

In addition, the embodiments of the present disclosure may also sense accelerations in a plurality of different directions by providing a plurality of acceleration sensors 100.

In order to further improve a sensitivity of the acceleration sensed by the acceleration sensor 100, in some embodiments, a dielectric layer 109 is provided between the fixed electrode 103 and the conductive electrode 104 included in the acceleration sensor 100. For example, materials of the dielectric layer 109 may include, but are not limited to, paraffin wax, mica, diamond, polyester, and the like.

Taking FIG. 2 as an example, the acceleration sensor 100 including the dielectric layer 109 is exemplarily described below.

Figure 2:
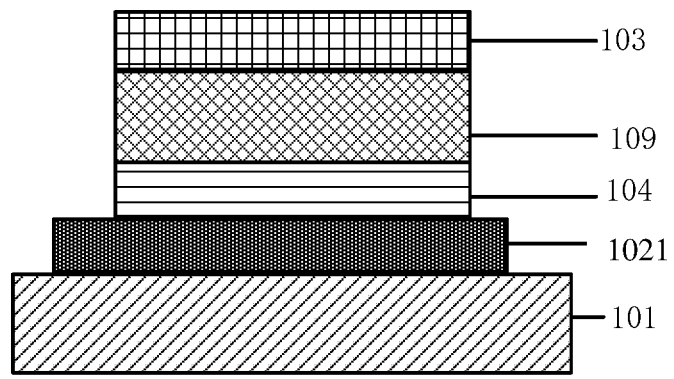
FIG. 2 is a cross-sectional view of an acceleration sensor provided by some embodiments of the present disclosure along the plane A-A of FIG. 1.

FIG. 2 is a cross-sectional view of the acceleration sensor 110 along the plane A-A of FIG. 1, and the acceleration sensor 100 illustrated in FIG. 2 includes a base 101, a mass 102, a dielectric layer 109, and a fixed electrode 103, and the mass 102 includes a moving member 1021 and a conductive electrode 104. For example, the base 101, the moving member 1021, the conductive electrode 104, the dielectric layer 109, and the fixed electrode 103 are sequentially provided from bottom to top. It should be noted that the mass 102 (or the moving member 1021) and the base 101 illustrated in FIG. 2 are not in close contact, so that the mass 102 may move in parallel relative to the base 101. For example, a distance between the mass 102 and the base 101 may be 0.5 mm. For example, the conductive electrode 104 may also be embedded in the moving member 1021.

In other examples, in the acceleration sensor 100, the base 101, the fixed electrode 103, the dielectric layer 109, the conductive electrode 104, and the moving member 1021 may also be sequentially provided from bottom to top, and the embodiments of the present disclosure are not limited thereto.

In the above embodiments of the present disclosure, since the dielectric layer 109 is added between the fixed electrode 103 and the conductive electrode 104, a capacitance value of a plate capacitor having an overlapping area formed by the fixed electrode 103 and the conductive electrode 104 may be effectively increased. Since the capacitance value of the capacitor increases, the sensitivity of the acceleration sensor 100 to sense an acceleration is improved.

In at least one embodiment of the present disclosure, in order to fix the mass 102 (or the moving member 1021) on the base 101 and make the mass 102 move a certain displacement in a first direction (i.e., a direction of the acceleration a) parallel to the base 101, the acceleration sensor 100 may further include a cantilever beam 105 on the base 101, and the mass 102 (or the moving member 1021) is connected to the cantilever beam 105.

As illustrated in FIG. 1, the mass 102 may be connected to the base 101 through the cantilever beam 105. For example, a terminal of the cantilever beam 105 may be connected to the base 101 through a first fixing member 106, and another terminal of the cantilever beam 105 may be connected to the mass 102 through a second fixing member 107. For example, the first fixing member 106 may be stacked using a micromachining process. For example, the second fixing member 107 includes screws.

In some embodiments, the cantilever beam 105 includes a spring or other elastic members capable of deforming (e.g., a rigid cantilever beam). For example, the acceleration sensor 100 illustrated in FIG. 1 includes four cantilever beams 105 that may undergo a certain elastic deformation. The embodiments of the present disclosure do not limit the number of the cantilever beams 105. In some examples, a spring may be used as the cantilever beam 105, and the size of the distance that the mass 102 moves is related to a spring force of the spring. In addition, the volume of the acceleration sensor 100 using a spring as the cantilever beam 105 is relatively large, while the volume of the acceleration sensor 100 using a rigid cantilever beam as the cantilever beam 105 is relatively small.

In some embodiments, two terminals of the fixed electrode 103 may also be fixed to the base 101 by a fixing member 108. For example, the fixing member 108 may be stacked using a micromachining process.

For example, the acceleration sensor 100 in FIG. 1 further includes a first wire 205 electrically connected to the fixed electrode 103 and a second wire 206 electrically connected to the conductive electrode 104. It should be illustrated that the embodiments of the present disclosure do not limit setting positions of the second wire 206 on the mass 102, that is, the second wire 206 may be set at other positions different from those in FIG. 1, as long as it is ensured that the second wire 206 may be electrically connected to the conductive electrode 104. The embodiments of the present disclosure may output a capacitance value of the capacitor in the acceleration sensor 100 through the first wire 205 and the second wire 206, so that a capacitance detection circuit converts this capacitance value into a detection signal.

The embodiments of the present disclosure do not limit the number of the conductive electrodes 104 provided on the mass 102, and correspondingly, the embodiments of the present disclosure do not limit the number of the fixed electrodes 103 fastened on the base 101. A plurality of plate capacitors that are in parallel connection may be obtained by providing a plurality of conductive electrodes 104 and a plurality of fixed electrodes 103, thereby the sensitivity of the acceleration sensor 100 when sensing an acceleration is improved.

Figure 3A:
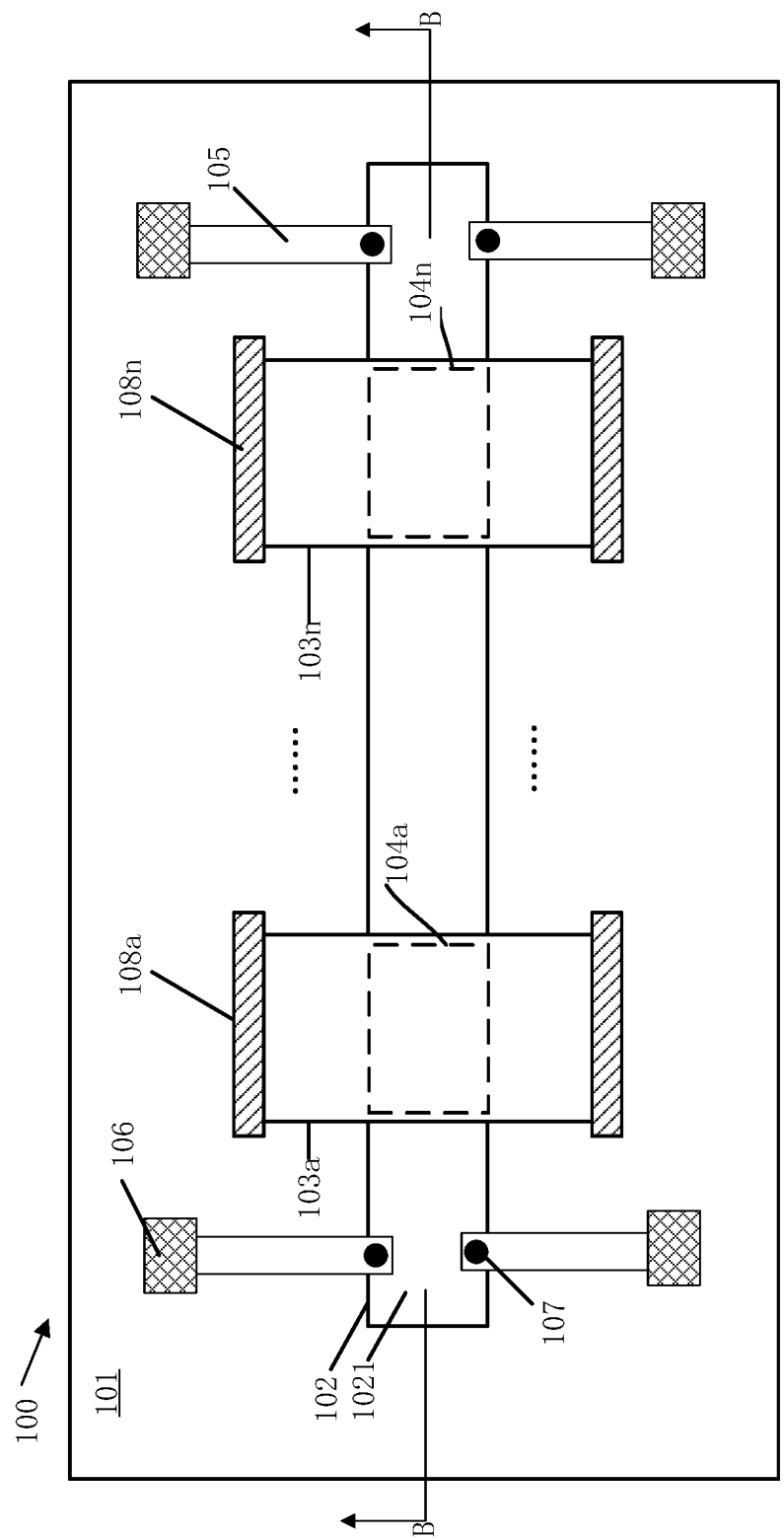
FIG. 3A is a second top view of an acceleration sensor provided by some embodiments of the present disclosure.

As illustrated in FIG. 3A, n conductive electrodes $104a \ldots 104n$ are arranged in parallel and with intervals on the moving member 1021 of the mass 102 of the acceleration sensor 100, and n fixed electrodes $103a \ldots 103n$ are arranged in parallel and with intervals on the base 101, correspondingly, where n is an integer greater than 1. For example, the n conductive electrodes $104a \ldots 104n$ are arranged in parallel along a moving direction of the mass 102 relative to the base 101, and the n fixed electrodes $103a \ldots 103n$ are also arranged in parallel along the moving direction of the mass 102 relative to the base 101, and the n conductive electrodes $104a \ldots 104n$ are in one-to-one correspondence with the n fixed electrodes $103a \ldots 103n$.

In order to fix the n fixed electrodes $103a \ldots 103n$ to the base 101, a plurality of fixing members $108a \ldots 108n$ are also provided to fix these fixed electrodes to the base 101 as illustrated in FIG. 3A.

Figure 3B:
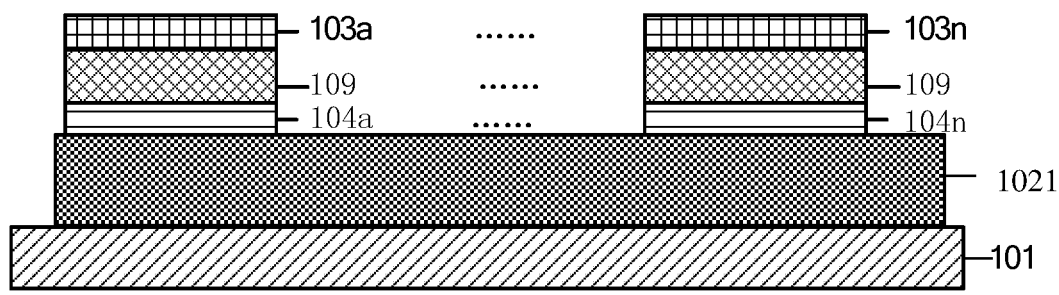
FIG. 3B is a cross-sectional view of an acceleration sensor provided by some embodiments of the present disclosure along the plane B-B of FIG. 3A.

FIG. 3B is a cross-sectional view of the acceleration sensor 100 along the plane B-B of FIG. 3A. It can be seen from FIG. 3B that, a dielectric layer 109 is also provided between two electrode plates of each conductive electrode $104a \ldots 104n$ and each fixed electrode $103a \ldots 103n$, respectively.

In other examples, a positional relationship between respective layers of the acceleration sensor 100 in FIG. 3B may be adjusted. For example, in the acceleration sensor 100, a base 101, a plurality of fixed electrodes $103a \ldots 103n$ arranged in parallel and with intervals, a dielectric layer 109 provided corresponding to the plurality of fixed electrodes $103a \ldots 103n$, a plurality of conductive electrodes $104a \ldots 104n$ arranged in parallel and with intervals, and a moving member 1021 may be sequentially provided from bottom to top.

The acceleration sensor 100 of the above embodiments of the present disclosure may enable a capacitance value of the capacitor and an acceleration sensed by the acceleration sensor 100 satisfy a linear relationship, and the linear relationship between the capacitance value of the capacitor and the acceleration sensed by the acceleration sensor 100 is illustrated below with reference to FIGS. 4-7B.

Figure 4:
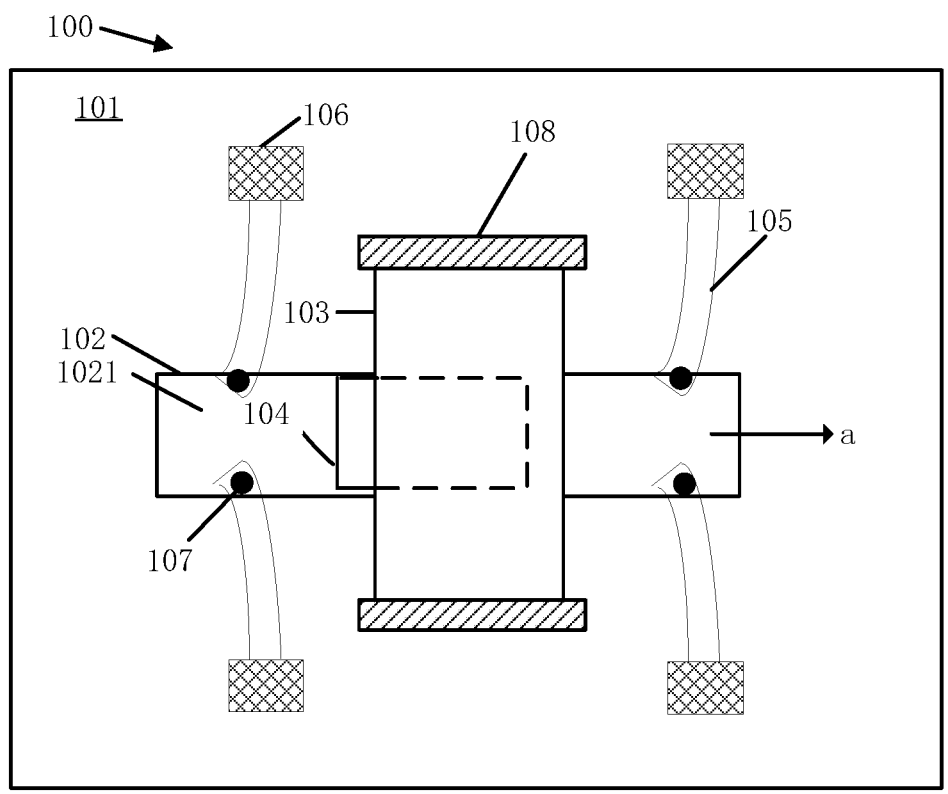
FIG. 4 is a schematic diagram of displacement deformations of an acceleration sensor provided by some embodiments of the present disclosure under an action of an acceleration.

FIG. 1 is a schematic diagram of the acceleration sensor 100 in a case where an acceleration is 0, and FIG. 4 is a schematic diagram of deformations of the acceleration sensor 100 of an embodiment of the present disclosure in a case where an acceleration is a.

The acceleration sensor 100 of FIG. 4, under an action of the acceleration a, causes a relative displacement between the mass 102 and the base 101, and a variation in an overlapping area between the conductive electrode 104 and the fixed electrode 103 (for example, part of the conductive electrode 104 in FIG. 4 moves out the rectangular overlapping region as illustrated in FIG. 1). Correspondingly, the terminal of the cantilever beam 105 connected to the mass 102 also undergoes a certain deformation.

Figure 5A:
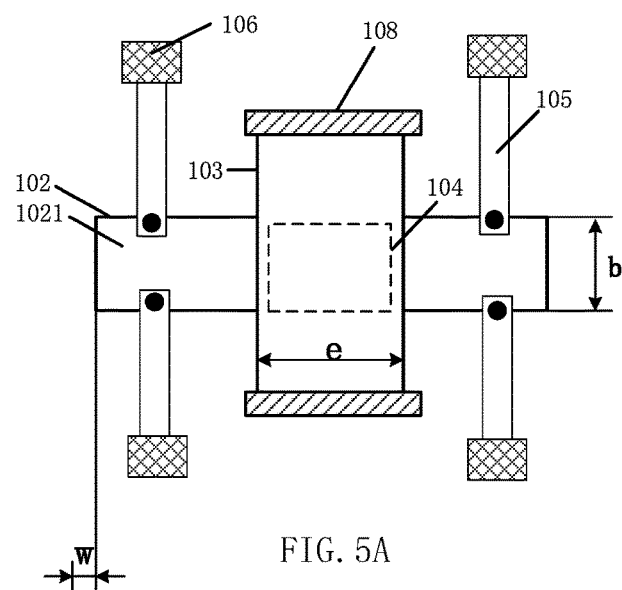
FIGS. 5A, 5B, 5C and 5D are schematic diagrams of an operation process of an acceleration sensor provided by some embodiments of the present disclosure.
Figure 5B:
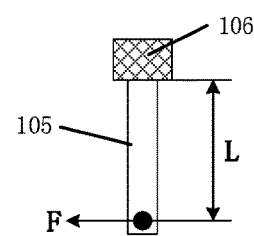
Figure 5C:
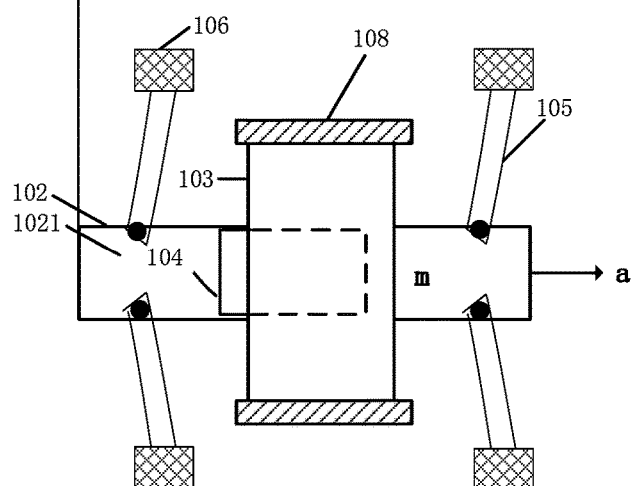
Figure 5D:
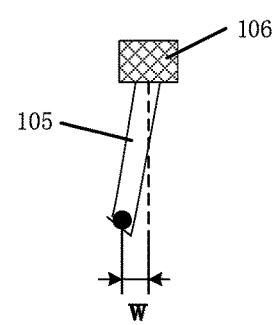

In order to explain the deformations of FIG. 4 relative to FIG. 1, FIGS. 5A-5D may be further referred to. In FIGS. 5A and 5D, only a rigid cantilever beam is taken as an example, and related calculation formulas are derived, which is not limitative to the embodiments of the present disclosure.

Figure 6A:
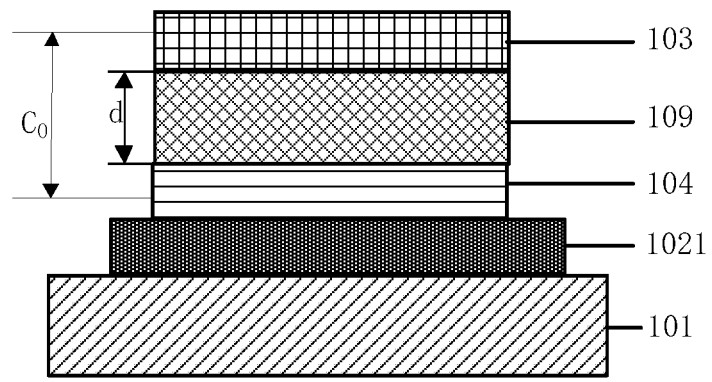
FIG. 6A is a structural diagram of a capacitor of an acceleration sensor provided by some embodiments of the present disclosure in a case where the acceleration is zero.
Figure 6B:
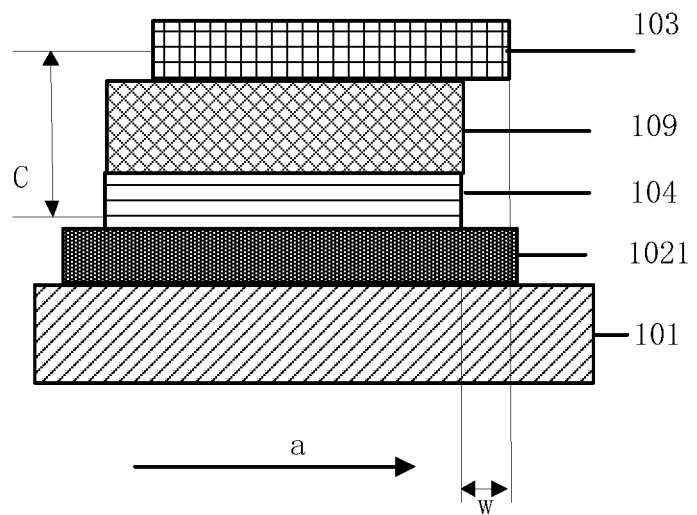
FIG. 6B is a structural diagram of a capacitor of an acceleration sensor provided by some embodiments of the present disclosure in a case where the acceleration is greater than zero.

An acceleration of the acceleration sensor 100 in FIG. 5A is 0, and an initial capacitance value C0 of a corresponding capacitor is illustrated in FIG. 6A. An acceleration of the acceleration sensor 100 in FIG. 5C is a, and a displacement of the mass 102 relative to the initial position in FIG. 5A under an action of the acceleration a is w, and at this time, a capacitance value C of the capacitor of the acceleration sensor 100 is illustrated in FIG. 6B.

Referring to FIGS. 5A-5D described above, it can be seen that the mass 102 moves to left by a distance w under the action of the acceleration a. Since each of the four cantilever beams 105 has one terminal connected to the mass 102, its displacement distance is w as well.

According to FIGS. 5A-5D, an inertial force formula ① and a displacement formula ② of the cantilever beam 105 are obtained as follows:

$$4F = ma \qquad (1)$$

$$w = \frac{FL^3}{3EI} \qquad (2)$$

In the above formula ①, F represents an acting force of a single cantilever beam 105 on the mass 102 (as illustrated in FIG. 5B), m represents a mass of the mass 102, and a represents an acceleration of the acceleration sensor 100.

EI in the above formula ② represents a bending rigidity of the cantilever beam 105, where E represents an elastic modulus of the cantilever beam 105 (i.e., a stress required to generate unit strain), and I represents an moment of inertia of a cross section of the cantilever beam 105 to a bending neutral axis; and L represents a length of the cantilever beam 105 (as illustrated in FIG. 5B).

It is assumed in FIG. 6A that an overlapping area between the fixed electrode 103 and the conductive electrode 104 is $S_0$. In a case where the mass 102 moves to left by the distance w (i.e., as illustrated in FIG. 6B) under an action of the acceleration a, the overlapping area between the fixed electrode 103 and the conductive electrode 104 becomes S. For example, it can be seen from the following formulas ③ and ⑤, that the capacitance value C (or, $C_0$) of the capacitor formed by the acceleration sensor 100 and the overlapping area S (or, $S_0$) between the fixed electrode 103 and the conductive electrode 104 are in a linear positive correlation relationship. That is, the larger the overlapping area S is, the larger the capacitance value C is.

According to the above parameters, formulas for calculating the capacitance value $C_0$ of FIG. 6A and the capacitance value C of FIG. 6B are obtained respectively as follows:

$$C_0 = \frac{\varepsilon_r S_0}{4\pi k d} \qquad (3)$$

$$S_0 = eb \qquad (4)$$

$$C = \frac{\varepsilon_r S}{4\pi k d} \qquad (5)$$

$$S = (e - w)b \qquad (6)$$

$\varepsilon_r$ in the above formulas ③ and ⑤ represents a dielectric constant of the dielectric layer 109, π represents the circumference ratio, k represents the electrostatic constant, and d represents a thickness of the dielectric layer 109 between the fixed electrode 103 and the conductive electrode 104 (as illustrated in FIG. 6A). b in the above formulas ④ and ⑥ represents a width of the mass 102 (as illustrated in FIG. 5A), e represents a width of the fixed electrode 103 (as illustrated in FIG. 5A), and w represents a displacement of the mass 102 relative to the base 101 under the action of the acceleration a (as illustrated in FIGS. 5C and 5D).

In order to obtain a relationship between the acceleration a of the acceleration sensor 100 and the capacitance C of the capacitor according to the embodiments of the present disclosure, by combining the above formulas ① to ⑥, a calculation formula of the acceleration a and the capacitance C may be obtained as follows:

$$a = \frac{12EIe}{mL^3}\left(1 - \frac{C}{C_0}\right) = K_1\left(1 - \frac{C}{C_0}\right) \qquad (7)$$

The parameter $K_1$ in the above formula ⑦ is a constant, and its magnitude is $$K_1 = \frac{12EIe}{mL^3}.$$

It can be seen from the above formula ⑦ that the acceleration a of the acceleration sensor 100 and the capacitance C satisfy a linear relationship (e.g., a linear negative correlation relationship). That is, the larger the capacitance value C is, the smaller the acceleration a is. Therefore, the embodiments of the present disclosure may determine a magnitude of the acceleration a only by monitoring the capacitance value C of the capacitor of the acceleration sensor 100.

Figure 7A:
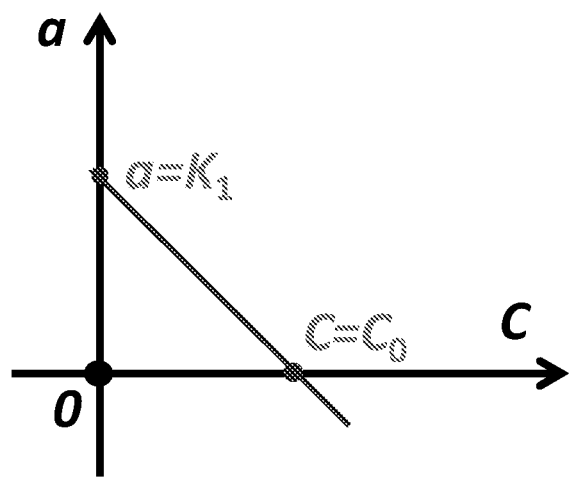
FIG. 7A is a diagram illustrating a relationship between an acceleration of an acceleration sensor and a capacitance value of a capacitor provided by some embodiments of the present disclosure.

FIG. 7A also illustrates a functional relationship between the acceleration a and the capacitance value C of the acceleration sensor 100 obtained in formula ⑦. It can be intuitively observed from FIG. 7A that the acceleration a and the capacitance value C satisfy a linear relationship (e.g., a negative correlation relationship). It may also be seen from FIG. 7A that, in a case where the capacitance value between the fixed electrode 103 and the conductive electrode 104 is 0, the magnitude of the acceleration a is: $a=K_1$; whereas, in a case where the capacitance value between the fixed electrode 103 and the conductive electrode 104 increases to $C_0$ (at this time, the capacitance value reaches the maximum value), the acceleration a decreases to 0.

Figure 7B:
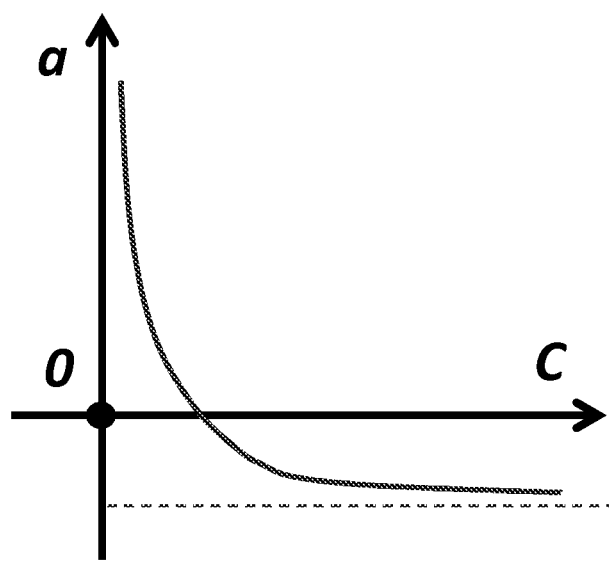
FIG. 7B is a diagram illustrating a relationship between an acceleration of an interdigital acceleration sensor and a capacitance value of a capacitor.

FIG. 7B further provides a diagram illustrating a relationship between an acceleration a and a capacitance value C of an interdigital acceleration sensor. It may be seen from FIG. 7B that the acceleration a and the capacitance value C of the interdigital acceleration sensor satisfy a nonlinear (i.e., curve) relationship.

It may be understood that the curve relationship of FIG. 7B is not convenient for data collection, processing and calculation as compared with the linear relationship of FIG. 7A. Therefore, the acceleration sensor 100 provided by the embodiments of the present disclosure has a technical effect of facilitating data collection, processing and calculation.

A capacitance detection circuit 200 provided by the embodiments of the present disclosure is described below with reference to FIGS. 8-11B.

It should be illustrated that the capacitance detection circuit 200 according to the embodiments of the present disclosure may be used to monitor a capacitance value of the capacitor included in the acceleration sensor 100 provided in FIGS. 1-7A, and may also be used to monitor capacitance values obtained by other capacitive acceleration sensors. For example, the capacitance detection circuit 200 provided by the embodiments of the present disclosure may also be used to monitor a capacitance value of a capacitor of the inter-digital acceleration sensor.

In the embodiments of the present disclosure, by the capacitance detection circuit 200, a capacitance value of the capacitor included in the acceleration sensor is monitored, and a monitored result is converted into a detection signal (e.g., a square wave signal) that is convenient to be processed. The sensitivity of monitoring an acceleration may be improved by analyzing the detection signal to obtain a correlation parameter value of the acceleration.

Figure 8:
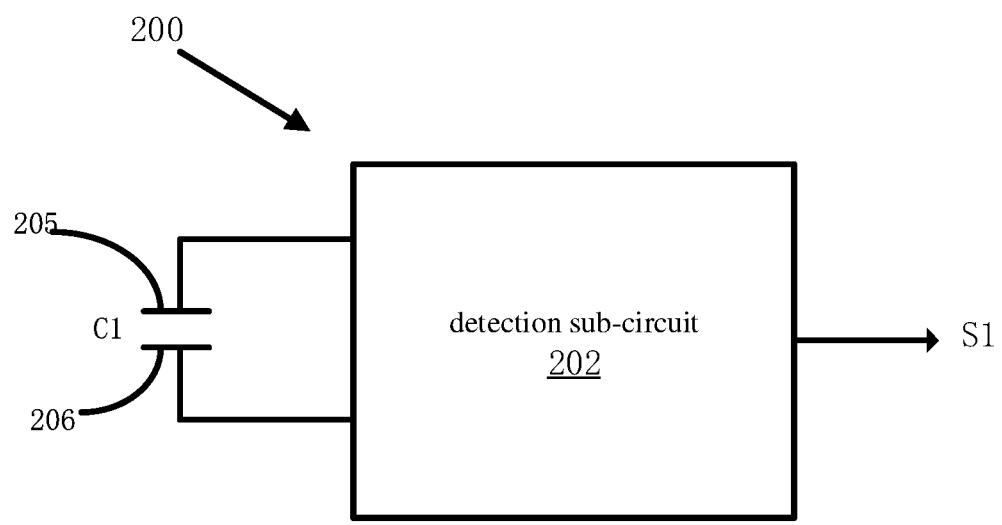
FIG. 8 is a block diagram of constitution of a capacitance detection circuit provided by some embodiments of the present disclosure.

As illustrated in FIG. 8, the capacitance detection circuit 200 may be used to monitor a capacitance value of the capacitor of the acceleration sensor 100. The capacitance detection circuit 200 illustrated in FIG. 8 includes: a first capacitor C1 and a detection sub-circuit 202, in which two terminals of the first capacitor C1 are electrically connected to a fixed electrode 103 and a conductive electrode 104 of the acceleration sensor 100, respectively (for example, two electrode plates of the first capacitor C1 may be connected to a first wire 205 and a second wire 206, respectively); and the detection sub-circuit 202 is configured to convert a capacitance value of the first capacitor C1 into a detection signal S1 and output the detection signal S1. In some examples, the capacitance value of the first capacitor C1 is equal to the capacitance value of the capacitor of the acceleration sensor 100. For example, the fixed electrode 103 and the conductive electrode 104 in the acceleration sensor 100 may serve as the two electrode plates of the first capacitor C1.

Figure 9A:
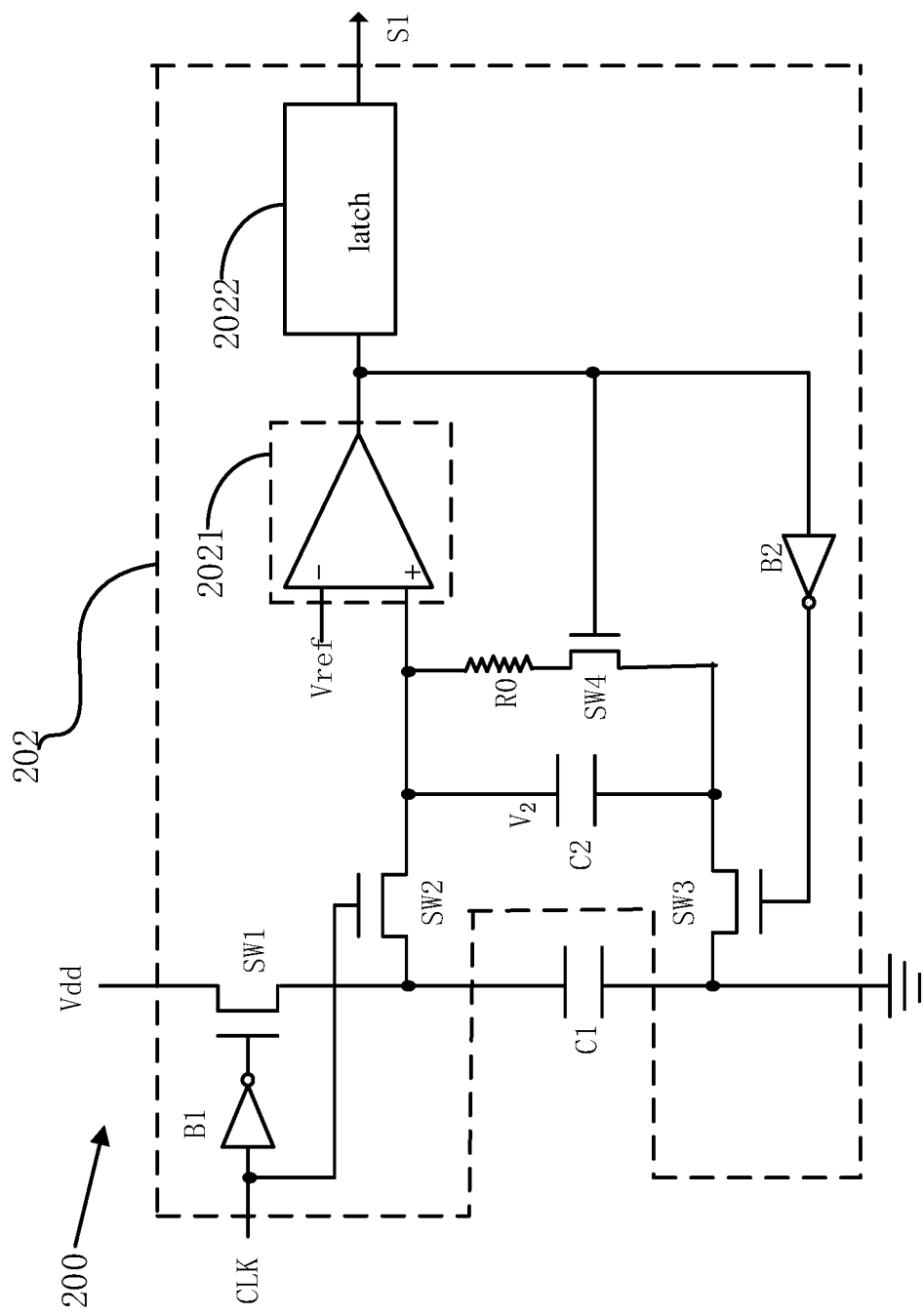
FIG. 9A is a first circuit diagram of a capacitance detection circuit provided by some embodiments of the present disclosure.
Figure 9B:
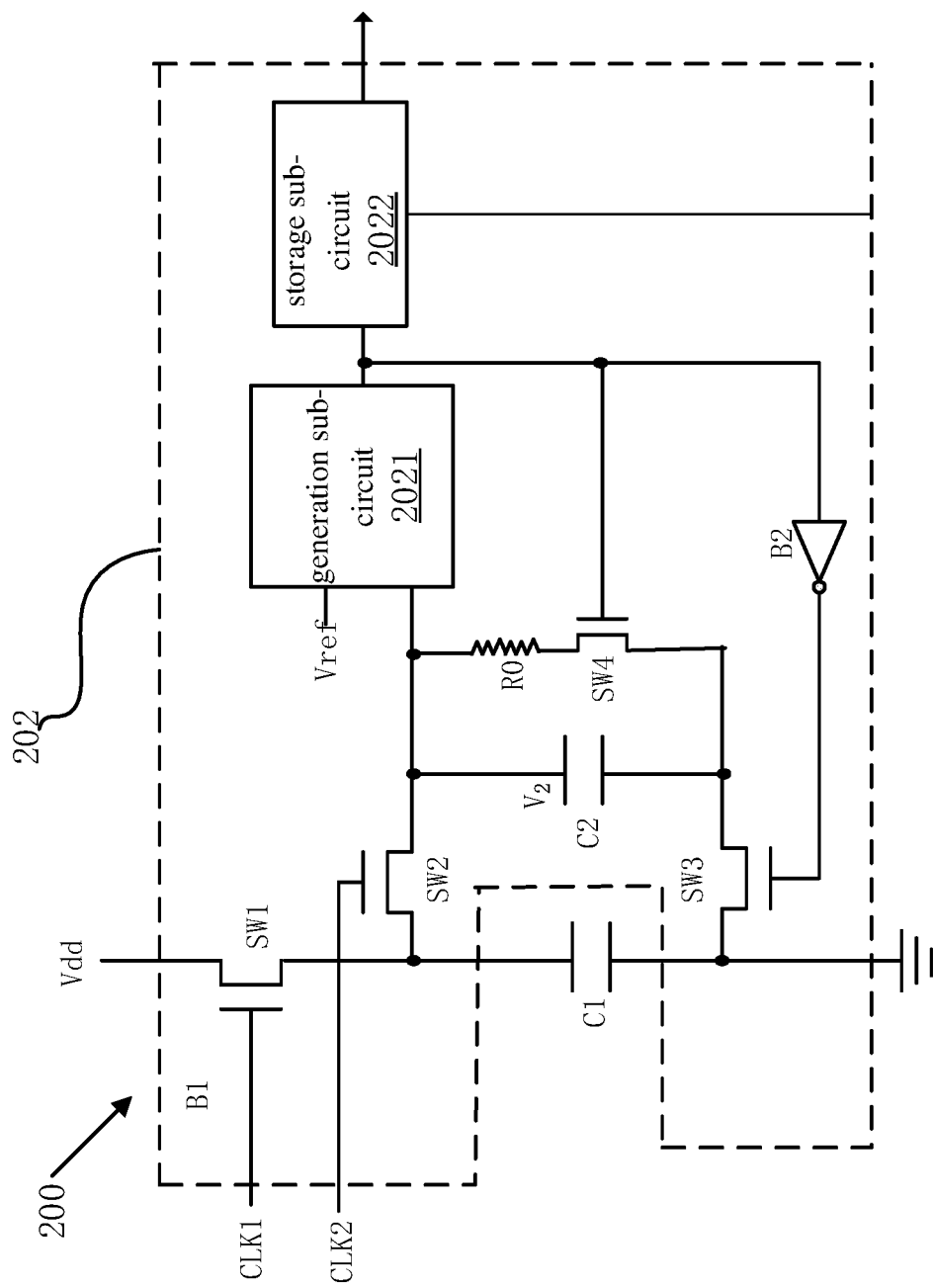
FIG. 9B is a second circuit diagram of a capacitance detection circuit provided by some embodiments of the present disclosure.

In some embodiments, as illustrated in FIGS. 9A and 9B, the detection sub-circuit 202 may include a first switch SW1, a second switch SW2, a third switch SW3, a second capacitor C2, a resistor R0, a generation sub-circuit 2021, and a storage sub-circuit 2022. For example, the first switch SW1, the second switch SW2, and the third switch SW3 may be switching transistors.

The first capacitor C1 is configured to charge in a case where the first switch SW1 is turned on; and to discharge in a case where the first switch SW1 is turned off, and the second switch SW2 and the third switch SW3 are both turned on, and to charge the second capacitor C2.

The generation sub-circuit 2021 is configured to generate the detection signal S1 according to a voltage of the second capacitor C2 and a reference voltage $V_{ref}$, in which the detection signal S1 generated is at a first level in a case where the voltage of the second capacitor C2 is lower than the reference voltage $V_{ref}$, and the detection signal S1 generated is at a second level in a case where the voltage of the second capacitor C2 is not lower than the reference voltage $V_{ref}$. In some examples, the first level is a voltage signal lower than the second level. For example, the first level is a low level of a square wave signal and the second level is a high level of the square wave signal.

The second capacitor C2 is configured to discharge through the resistor R0 in a case where the detection signal S1 is at the second level (e.g., the high level). For example, in the case where the detection signal S1 is at the high level, the discharge of the second capacitor C2 is controlled by a switching unit.

It should be illustrated that a capacitance value of the second capacitor C2 is smaller than the capacitance value of the first capacitor C1. The reference voltage $V_{ref}$ may be set small to enable the second capacitor C2 to complete a discharge process fast.

The storage sub-circuit 2022 is configured to buffer and output the detection signal S1.

In the embodiments of the present disclosure, the first capacitor C1 is charged under an action of a first voltage $V_{dd}$, and then a quantity of electric charges stored in the first capacitor C1 is measured by a number of times that the second capacitor C2 discharges, thereby a magnitude of the capacitance value of the first capacitor C1 is determined. Therefore, the capacitance detection circuit 200 provided by the embodiments of the present disclosure may effectively improve the sensitivity and speed of the detection of the capacitance value.

As illustrated in FIG. 9A, in some embodiments, the detection sub-circuit 202 further includes: a first inverter B1 which is configured to invert a clock signal CLK that is input from a clock signal terminal and output an inversion signal of the clock signal CLK to a control electrode of the first switch SW1; and a second inverter B2 which is configured to invert the detection signal S1 and output an inversion signal of the detection signal S1 to a control electrode of the third switch SW3, such that the third switch SW3 is turned on in a case where the detection signal S1 is at the first level (e.g., the low level).

It may be seen from the above description, in the embodiments of the present disclosure, the first switch SW1 is controlled to be turned on or turned off by the clock signal CLK, and the third switch SW3 is controlled to be turned on or turned off by the detection signal S1.

As illustrated in FIG. 9A, the detection sub-circuit 202 further includes a fourth switch SW4 which is configured to be turned on in a case where the detection signal S1 is at the second level (e.g., the high level), so that the second capacitor C2 discharges through the resistor R0.

As illustrated in FIG. 9A, an input terminal of the first inverter B1 is connected to the clock signal terminal to receive the clock signal CLK, and an output terminal of the first inverter B1 is connected to the control electrode of the first switch SW1; an input terminal of the second inverter B2 is connected to an output terminal of the generation sub-circuit 2021, and an output terminal of the second inverter B2 is connected to the control electrode of the third switch SW3; a first electrode of the first switch SW1 is connected to a first power supply terminal for receiving the first voltage $V_{dd}$ that is input, and a second electrode of the first switch SW1 is connected to a first terminal of the first capacitor C1; a second terminal of the first capacitor C1 is grounded; a control electrode of the second switch SW2 is connected to the clock signal terminal for receiving the clock signal CLK, a first electrode of the second switch SW2 is connected to the first terminal of the first capacitor C1, and a second electrode of the second switch SW2 is connected to a first terminal of the second capacitor C2; a first electrode of the third switch SW3 is connected to a second terminal of the second capacitor C2, and a second electrode of the third switch SW3 is connected to the second terminal of the first capacitor C1; and a control electrode of the fourth switch SW4 is connected to the output terminal of the generation sub-circuit 2021, a first electrode of the fourth switch SW4 is connected to a first terminal of the resistor R0, and a second electrode of the fourth switch SW4 is connected to the second terminal of the second capacitor C2.

As illustrated in FIG. 9A, the generation sub-circuit 2021 may include a comparator; and a non-inverting input terminal of the comparator is respectively connected to the first terminal of the second capacitor C2 and a second terminal of the resistor R0, an inverting input terminal of the comparator is connected to a reference voltage terminal for receiving the reference voltage $V_{ref}$, and an output terminal of the comparator is connected to the input terminal of the second inverter B2.

As illustrated in FIG. 9A, the storage sub-circuit 2022 includes a latch, whose input terminal is connected to the output terminal of the generation sub-circuit input 2021, and whose output terminal serves as an output terminal of the capacitance detection circuit 200.

The difference between the detection sub-circuit 202 of FIG. 9A and that of FIG. 9B is that in FIG. 9B, the first switch SW1 and the second switch SW2 are controlled to be turned on or turned off by two clock signals (i.e., a first clock signal CLK1 and a second clock signal CLK2), respectively, thereby the first inverter B1 illustrated in FIG. 9A may be omitted. For example, as illustrated in FIG. 9B, the control electrode of the first switch SW1 is connected to a first clock signal terminal for receiving the first clock signal CLK1 that is input, and the control electrode of the second switch SW2 is connected to a second clock signal terminal for receiving the second clock signal CLK2 that is input. It should be illustrated that the first clock signal CLK1 and the second clock signal CLK2 are inverted signals.

The generation sub-circuit 2021 of FIG. 9B may also include a comparator, and connections mode of the comparator may be referred to FIG. 9A. The storage sub-circuit 2022 of FIG. 9B may also include a latch, and the specific connections of the latch may be referred to FIG. 9A. Other circuit elements of FIG. 9B are not repeated, and relevant contents may be referred to the contents illustrated in FIG. 9B or the above description for FIG. 9A.

The detection signal S1 generated and output by the capacitance detection circuit 200 as illustrated in FIGS. 9A and 9B includes a square wave signal, and a number of pulses of the square wave signal and an acceleration of the acceleration sensor 100 are in a linear relationship.

An operation process of the capacitance detection circuit 200 is illustrated with reference to FIG. 9A, and a conclusion that a number of square waves and an acceleration of the acceleration sensor 100 are in a linear relationship is further explained with reference to the operation process. When describing the operation process of the capacitance detection circuit 200, it is assumed that the first switch SW1, the second switch SW2, the third switch SW3, and the fourth switch SW4 of FIG. 9A are all transistors that are turned on at a high level (e.g., N-type transistors). It should be illustrated that the embodiments of the present disclosure do not limit that the above four switching units have to be turned on at a high level. For example, one or more of the first switch SW1, the second switch SW2, the third switch SW3, and the fourth switch SW4 may also adopt a transistor that is turned on at a low level (e.g., a P-type transistor).

In a first step, the clock signal CLK of FIG. 9A is set low, the first switch SW1 is turned on (closed) correspondingly, and the second switch SW2 is turned off (open), and at this time, the first voltage $V_{dd}$ rapidly charges the first capacitor C1. In a case where a charging voltage of the first capacitor C1 reaches the first voltage $V_{dd}$, the clock signal CLK is set high. In a second step, since the clock signal CLK is set high, the first switch SW1 is turned off and the second switch SW2 is turned on, and electric charges on the first capacitor C1 charge the second capacitor C2. In a case where a voltage of the second capacitor C2 reaches the reference voltage $V_{ref}$, the comparator outputs a high-level pulse, which is sent to the latch to be latched. Meanwhile, the comparator outputs the high-level pulse to turn off the third switch SW3 and turn on the fourth switch SW4, after which the second capacitor C2 discharges to the resistor R0. The process of the above second step is repeated until the electric charges of the first capacitor C1 are discharged completely.

The above operation process may also be represented by the following table. In the following table, the number "1" indicates the control electrode of the first switch SW1, the second switch SW2, the third switch SW3 or the fourth switch SW4 is connected to the high level, and the number "0" indicates the control electrode of the first switch SW1, the second switch SW2, the third switch SW3 or the fourth switch SW4 is connected to the low level. For example, the number "1" in the table for the second switch SW2 indicates that the clock signal CLK is at the high level, and the number "0" indicates that the clock signal CLK is at the low level; the number "1" in the table for the fourth switch SW4 indicates that the detection signal S1 is at the high level, and the number "0" indicates that the detection signal S1 is at the low level.

| Step | States of the first capacitor C1 and the second capacitor C2 | SW1 | SW2 | SW3 | SW4 |
| --- | --- | --- | --- | --- | --- |
| Step 1 | the first capacitor C1 charging | 1 | 0 | 1 | 0 |
| Step 2 | the first capacitor C1 discharging, and charging the second capacitor C2 | 0 | 1 | 1 | 0 |
| Step 3 | the second capacitor C2 discharging | 0 | 1 | 0 | 1 |

Repeating steps 2-3 until electric charges on the first capacitor C1 are discharged completely.

With reference to the above operation process and according to law of electric charge conservation, a formula may be obtained as follows:

$$CV_{dd} = NC_{int}V_{ref}$$

Therefore, there is:

$$C = \frac{NC_{int}V_{ref}}{V_{dd}} \qquad (8)$$

N in the above formula (8) represents a number of times that the second level (i.e., the high level) that is output by the detection signal S1 occurs, and also represents a number of times that the second capacitor C2 discharges (FIG. 10A or 10B may be referred to later); and C represents a capacitance value of the first capacitor C1 and $C_{int}$ represents a capacitance value of the second capacitor C2.

It may be seen from the above formula (8) that the number of times N that the high level (i.e., the second level) occurs in the detection signal S1 output by the latch in the storage sub-circuit 2022 and the capacitance value C of the first capacitor C1 satisfy a linear positive correlation relationship. Therefore, in the embodiments of the present disclosure, a relative magnitude of the capacitance value of the first capacitor C1 may be directly determined by counting the number of times N that the high level occurs in the detection signal S1.

Figure 10A:
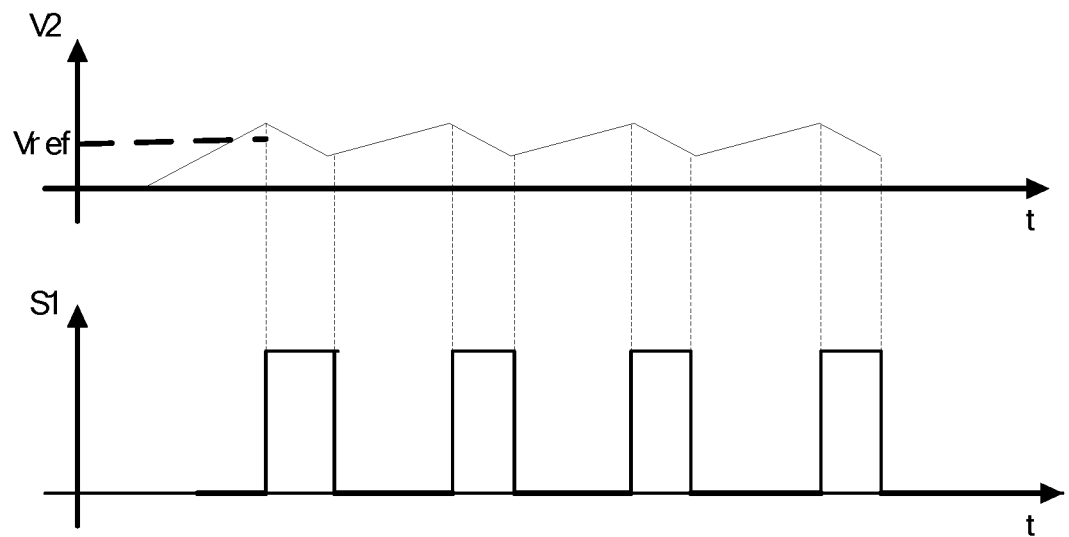
FIG. 10A is a first diagram illustrating an corresponding relationship between charging and discharging processes of a second capacitor and a detection signal provided by some embodiments of the present disclosure.
Figure 10B:
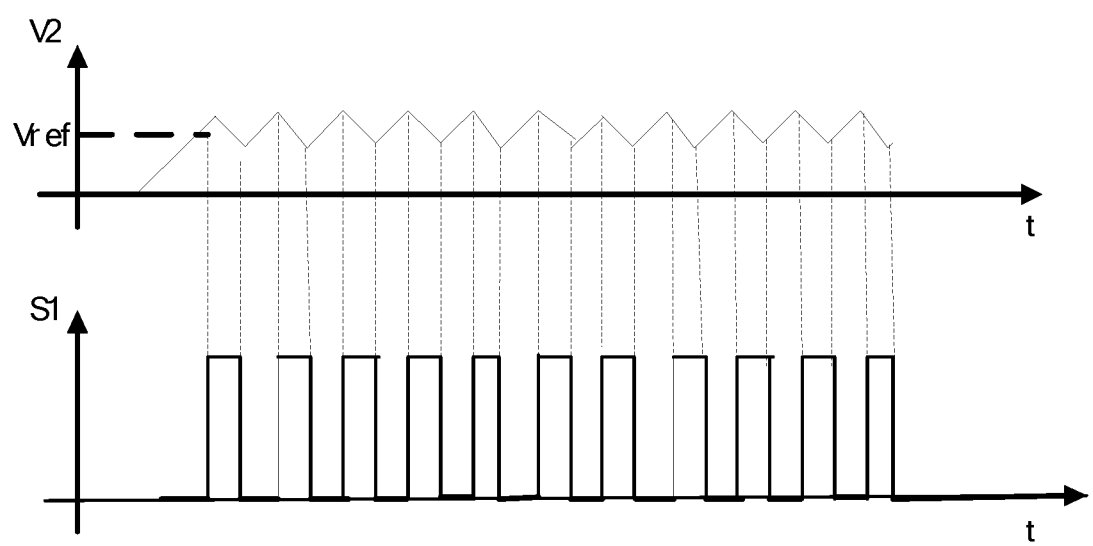
FIG. 10B is a second diagram illustrating an corresponding relationship between charging and discharging processes of a second capacitor and a detection signal provided by some embodiments of the present disclosure.

FIGS. 10A and 10B provide charge-discharge process diagrams of the second capacitor C2 corresponding to the operation process of FIG. 9A described above and waveform diagrams of the detection signal S1. For example, FIGS. 10A and 10B are waveform diagrams of the detection signal S1 output by the capacitance detection circuit 200 and diagrams of a charge-discharge process of the second capacitor C2, in cases where the acceleration sensor 100 is under different accelerations a. FIG. 10A is a waveform diagram of the detection signal S1 and a charge-discharge process diagram of the second capacitor C2 in a case where the acceleration is larger, while FIG. 10B is a waveform diagram of the detection signal S1 and a charge-discharge process diagram of the second capacitor C2 in a case where the acceleration is smaller.

It can be seen from FIGS. 10A and 10B that, in a case where the second capacitor C2 charges, the detection signal S1 outputs a low level signal; and in a case where the second capacitor C2 discharges, the detection signal S1 outputs a high level signal. Therefore, the number of times that the high level occurs in the detection signal S1 is equal to the number of times that the second capacitor C2 discharges. For example, in FIGS. 10A and 10B, in a case where a voltage V2 of the second capacitor C2 is increased to the reference voltage $V_{ref}$ by charging, the second capacitor C2 starts a discharge process, and the corresponding detection signal S1 outputs the high level during the discharge process.

In addition, by comparing FIGS. 10A and 10B, it may also be seen that the larger an acceleration of the acceleration sensor 100 is, the smaller the number of times N that the high level output by the latch in the storage sub-circuit 2022 occurs. This is due to that the larger the acceleration a of the acceleration sensor 100 is, the larger a displacement of the mass 102 in the acceleration sensor 100 is, thereby the smaller a capacitance value of the capacitor of the acceleration sensor 100 is (the smaller the capacitance value C of the first capacitor C1 is). In a case where the smaller the capacitance value of the capacitor of the acceleration sensor 100 is, the slower a charging speed of the second capacitor C2 is, and correspondingly, the lower a frequency of a waveform of the detection signal S1 output by the latch in the storage sub-circuit 2022 is, that is, the smaller the number of times N that the high level output by the latch in the storage sub-circuit 2022 occurs in the same time period is.

A calculation formula of an acceleration a sensed by the acceleration sensor 100 and a number of times N that the high level (i.e., the second level) output by the detection signal S1 occurs may be further explained below.

According to the above formulas ⑦ and ⑧, there is:

$$a = K_1 \left(1 - \frac{N}{K_2}\right) \qquad ⑨$$

The parameter K1 in the above formula ⑨ is a constant, and is specifically expressed as:

$$K_1 = \frac{12EIe}{mL^3};$$

and the parameter K2 in the above formula ⑨ is a constant, and is specifically expressed as:

$$K_2 = \frac{C_0 V_{dd}}{C_{int} V_{ref}}.$$

Figure 11A:
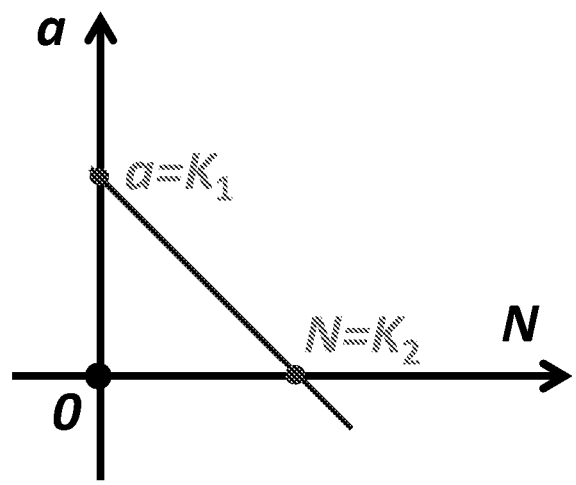
FIG. 11A is a first diagram illustrating a relationship between an acceleration of an acceleration sensor and a number of times that a high level is output by a detection signal provided by some embodiments of the present disclosure.

With reference to the above formula ⑨, a relationship between the acceleration a sensed by the acceleration sensor 100 and the number of times N that the high level occurs in the detection signal S1 output by the latch in the storage sub-circuit 2022 may be obtained as illustrated in FIG. 11A.

It can be seen from FIG. 11A that, the acceleration a sensed by the acceleration sensor 100 and the number of times N that the high level in the detection signal S1 output satisfy a linear relationship. In other words, the acceleration a and the number of times that the second capacitor C2 discharges satisfy a linear relationship.

In addition, it can also be seen from FIG. 11A that, in a case where a value of the acceleration a is K1, the corresponding number of times N that the high level output is 0; and in a case where the acceleration a decreases to 0, the number of times N that the high level output increases to a value of the parameter K2. That is, the acceleration a sensed by the acceleration sensor 100 and the number of times N that the high level in the detection signal S1 output satisfy a linear negative correlation relationship.

For example, in at least one embodiment, the linear negative correlation relationship between the acceleration a and the number of times N that the high level in the detection signal S1 output may be used to monitor whether a vehicle is collided. For example, referring to FIG. 11B, it is known that an acceleration of a vehicle is greater than a maximum acceleration threshold value $a_{max}$ in a case where the vehicle is collided, the embodiments of the present disclosure may use the above formula ⑨ to solve and obtain the number of times Nmin that the high level output by the detection signal S1 occurs corresponding to the maximum acceleration threshold value $a_{max}$. After that, in a case where it is determined that the number of times N that the high level is output by the detection signal S1 is less than or equal to Nmin, it may be directly concluded that the vehicle is collided.

In the embodiments of the present disclosure, by analyzing the number of times N that the high level in the detection signal S1 output by the capacitance detection circuit 200 occurs, a magnitude of the capacitance value may be directly determined (or a magnitude of the acceleration may be further determined), therefore the calculation amount is reduced, and the processing speed is improved.

It should be illustrated that the embodiments of the present disclosure do not limit that the capacitance detection circuit 200 may only be used in conjunction with the acceleration sensor 100 of the embodiments of the present disclosure. For example, an interdigital acceleration sensor may be used in conjunction with the capacitance detection circuit 200 of the embodiments of the present disclosure. For example, FIG. 11C is a diagram illustrating a relationship between an acceleration a and a number of times N that a high level is output obtained in a case where the interdigital acceleration sensor is used in conjunction with the capacitance detection circuit 200 of the embodiments of the present disclosure. It can be seen from FIG. 11C that, in a case where the interdigital acceleration sensor is adopted, the acceleration a and the number of times N that the high level is output satisfy a nonlinear (i.e., curve) relationship. In the case where the interdigital acceleration sensor is used in conjunction with the capacitance detection circuit 200, it is also possible to determine the magnitude of the acceleration a by counting the number of times N that the high level occurs in the detection signal S1.

A capacitance detection method 300 provided by at least one embodiment of the present disclosure is described below with reference to FIG. 12. The capacitance detection method 300 may be used in the capacitance detection circuit 200 in the at least one embodiment described above.

Figure 12:
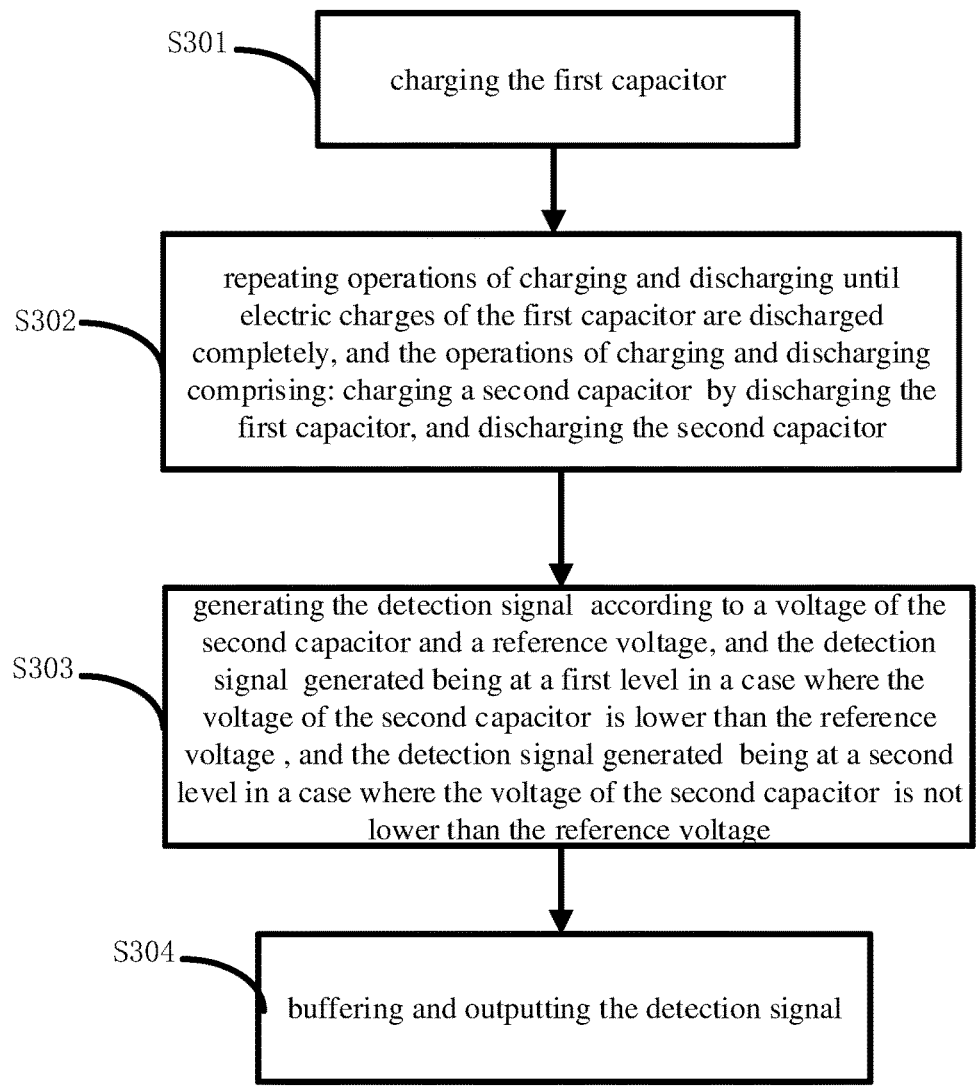
FIG. 12 is a flowchart of a capacitance detection method provided by some embodiments of the present disclosure.

As illustrated in FIG. 12, the capacitance detection method 300 includes: step S301, charging a first capacitor C1; step S302, repeating a charge and discharge operation until electric charges of the first capacitor C1 are discharged completely, in which the charge and discharge operation includes: charging a second capacitor C2 by discharging the first capacitor C1, and discharging the second capacitor C2; step S303, generating a detection signal S1 according to a voltage of the second capacitor C2 (e.g., a voltage V2 illustrated in FIGS. 9A and 9B) and a reference voltage $V_{ref}$, in which the generated detection signal S1 is at a first level in a case where the voltage of the second capacitor C2 is lower than the reference voltage $V_{ref}$, and the generated detection signal S1 is at a second level in a case where the voltage of the second capacitor C2 is not lower than the reference voltage $V_{ref}$; and step S304, buffering and outputting the detection signal S1. For example, the first level is a low level of a square wave signal and the second level is a high level of the square wave signal.

Processing details involved in the above steps S301, S302, and S303 may be referred to the related description for the above capacitance detection circuit 200, which is not repeated here.

At least one embodiment of the present disclosure also provides an acceleration processing circuit 400, which may be connected to the acceleration sensor 100 described in the above embodiments. Structures of the acceleration sensor 100 may be referred to the description of FIGS. 1-7A, which are not repeated here.

Figure 13:
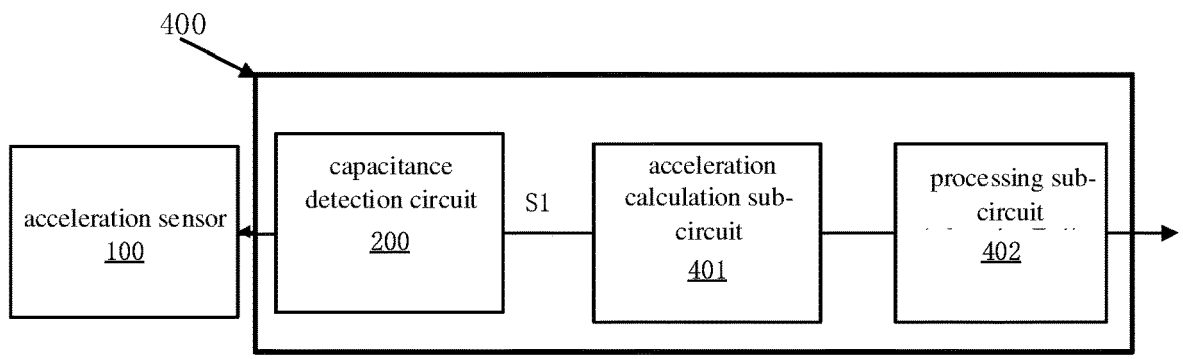
FIG. 13 is a block diagram of constitution of an acceleration processing circuit provided by some embodiments of the present disclosure.

As illustrated in FIG. 13, the acceleration processing circuit 400 includes the above-mentioned capacitance detection circuit 200, an acceleration calculation sub-circuit 401, and a processing sub-circuit 402. The capacitance detection circuit 200 is configured to output a detection signal S1 to the acceleration calculation sub-circuit 401; the acceleration calculation sub-circuit 401 is configured to calculate a correlation parameter value of an acceleration according to the detection signal S1; and the processing sub-circuit 402 is configured to perform an operation corresponding to the correlation parameter value of the acceleration (e.g., safety protection measures of a motor vehicle) according to the correlation parameter value of the acceleration. For example, the acceleration processing circuit 400 may further include the acceleration sensor 100.

In some embodiments, the above-mentioned correlation parameter value and an acceleration measured by the acceleration sensor are in a linear relationship. For example, the detection signal S1 includes a square wave signal, and the correlation parameter value includes a number of pulses of the square wave signal (e.g., the above-mentioned number of times N that a high level is output).

Figure 11B:
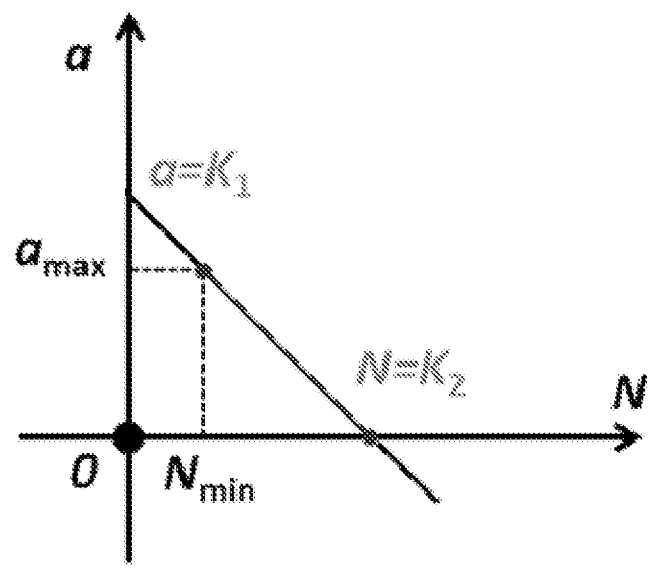
FIG. 11B is a second diagram illustrating a relationship between an acceleration of an acceleration sensor and a number of times that a high level is output by a detection signal provided by some embodiments of the present disclosure.
Figure 11C:
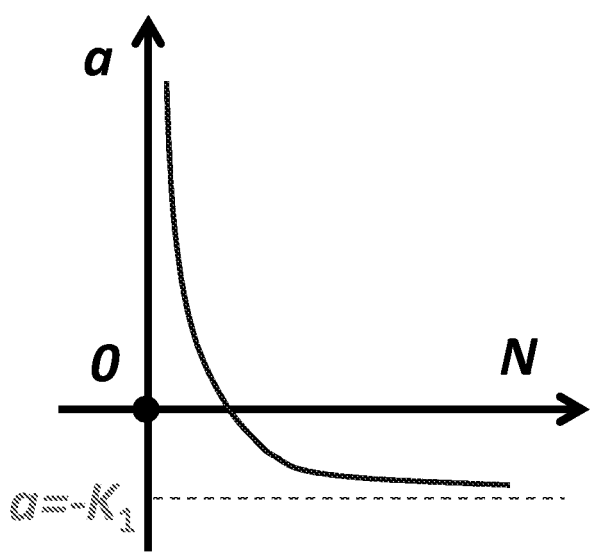
FIG. 11C is a diagram illustrating a relationship between an acceleration of an interdigital acceleration sensor and a number of times that a high level is output by a detection signal.

In some embodiments, the detection signal S1 output by the capacitance detection circuit 200 is a square wave signal, and the processing sub-circuit 402 is configured to perform the safety protection measures in a case where a number of pulses of the square wave signal is less than a preset threshold value (e.g., Nmin illustrated in FIG. 11B is the preset threshold value). For example, the safety protection measures include: opening an airbag, making an alarm call, sending out a prompt message or generating an alarm signal (for example, generating the alarm signal may include activating a double flash signal of a vehicle, etc.).

In addition, the above-mentioned capacitance detection circuit 200 included in the acceleration processing circuit 400 may be specifically referred to the description for FIGS. 8-9B, which is not repeated here.

In some examples, the above-mentioned acceleration processing circuit 400 may be used to determine whether a vehicle is collided.

In the embodiments of the present disclosure, the acceleration processing circuit 400 may quickly determine whether an acceleration exceeds a safety threshold value according to a correlation parameter value of the acceleration, thereby safety protection measures are activated in time and personal safety of drivers and passengers is effectively ensured.

At least one embodiment of the present disclosure also provides an acceleration processing method 500, which may be used in the acceleration processing circuit 400.

Figure 14:
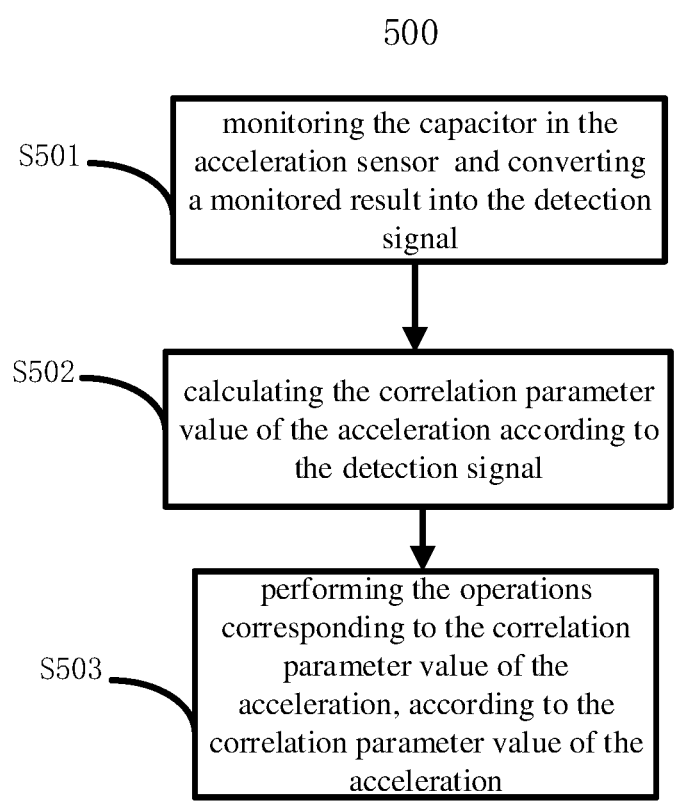
FIG. 14 is a flowchart of an acceleration processing method provided by some embodiments of the present disclosure.

As illustrated in FIG. 14, the acceleration processing method 500 may include: step S501, monitoring a capacitor in the acceleration sensor 100 and converting a monitored result into a detection signal S1; step S502, calculating a correlation parameter value of an acceleration according to the detection signal S1; and step S503, performing corresponding safety protection measures according to the correlation parameter value of the acceleration.

In some embodiments, the detection signal S1 is a square wave signal. Correspondingly, the step S502 includes: counting a number of pulses of the square wave signal during a predetermined time period, and the step S503 includes: determining whether the number of the pulses is less than a preset threshold value, and in a case where the number of the pulses is less than the preset threshold value, performing safety protection measures. For example, the preset threshold value may be Nmin as illustrated in FIG. 11B.

For example, the safety protection measures include: opening an airbag, making an alarm call, sending a prompt message or generating an alarm signal (for example, the alarm signal may include a double flash signal, etc.).

Figure 15:
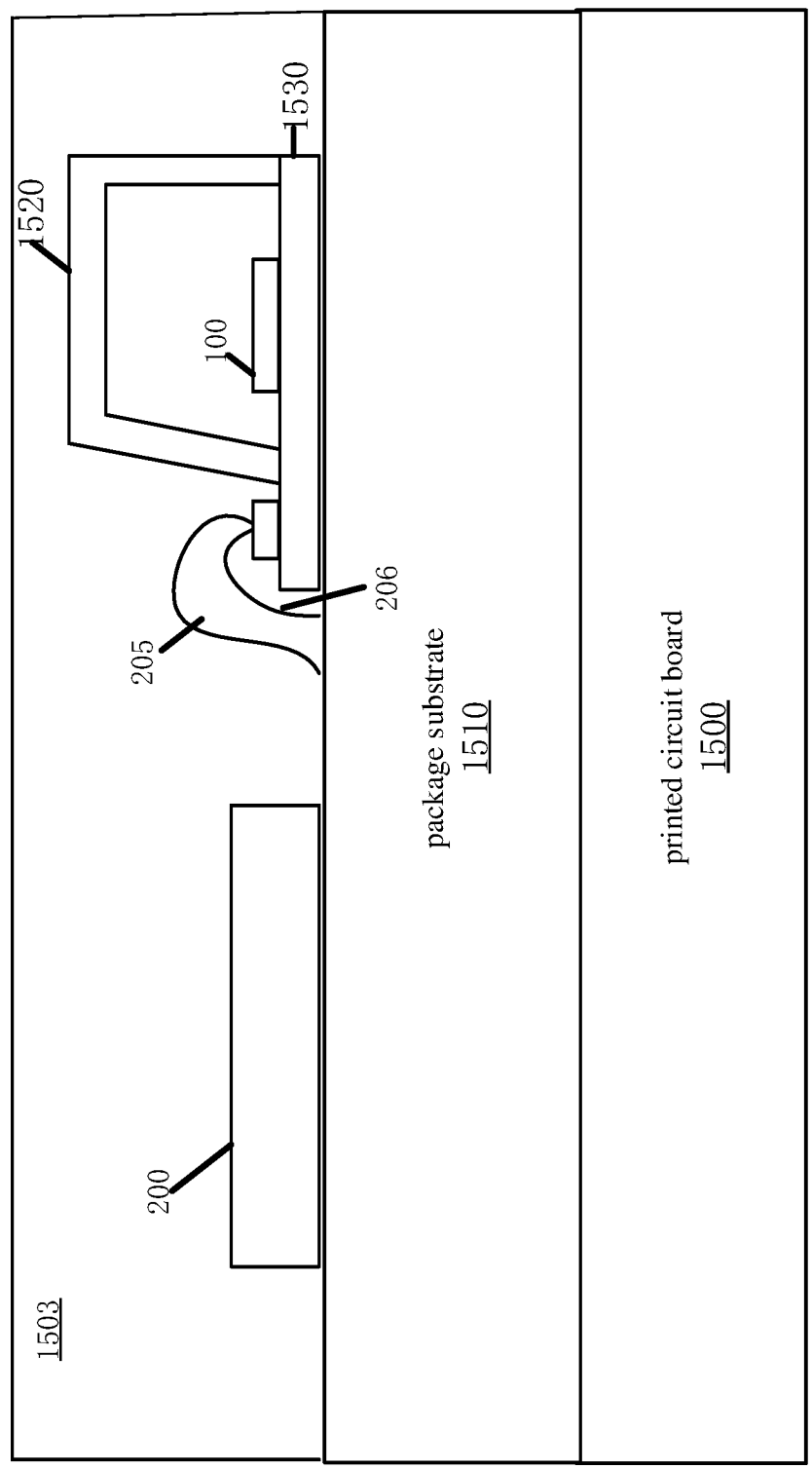
FIG. 15 is a schematic diagram of a package circuit provided by some embodiments of the present disclosure.

As illustrated in FIG. 15, the embodiments of the present disclosure also provide a structure for packaging an acceleration sensor 100 and a capacitance detection circuit 200.

The acceleration sensor 100 may be a micro-electromechanical-system (MEMS)-based acceleration sensor, that is, the embodiments of the present disclosure may form an inertial measurement element (i.e., the acceleration sensor 100) on a silicon wafer 1530 through a micromachining process. The embodiments of the present disclosure also construct the capacitance detection circuit 200 based on an application specific integrated circuit (ASIC). Since the micromachining process and the application specific integrated circuit (ASIC) adopt similar processes, the acceleration sensor 100 and the capacitance detection circuit 200 may be integrated on a package substrate 1510 and a printed circuit board 1500. For example, the acceleration sensor 100 may be manufactured using a micromachining process technology, and the capacitance detection circuit 200 may be manufactured using an application specific integrated circuit (ASIC) process technology, and then both may be stuck in a same package box 1503 (as illustrated in FIG. 15).

In some examples, as illustrated in FIG. 15, a nut cap 1520 may also be used to protect the acceleration sensor 100.

In order to interconnect the acceleration sensor 100 and the capacitance detection circuit 200, a first wire 205 electrically connected to a fixed electrode 103 of the acceleration sensor 100 and a second wire 206 electrically connected to a conductive electrode 104 are also illustrated in FIG. 15.

It should be illustrated that the acceleration processing circuit 400 of the above-mentioned embodiments of the present disclosure may also be constructed based on the application specific integrated circuit (ASIC), so the capacitance detection circuit 200 as illustrated in FIG. 15 may be replaced with the acceleration processing circuit 400. Finally, the acceleration sensor 100 and the acceleration processing circuit 400 are packaged together.

In the embodiments of the present disclosure, the acceleration sensor 100 and the capacitance detection circuit 200 (or the acceleration processing circuit 400) are packaged with reference to FIG. 15, which may improve the stability of the entire device.

At least one embodiment of the present disclosure also provides a storage medium on which a computer instruction is stored, and one or more steps of the acceleration processing method 500 are performed in a case where the computer instruction is executed by a processor.

For example, the storage medium may include any combinations of one or more computer program products, and the computer program products may include various forms of computer readable memory, for example, volatile memory and/or non-volatile memory. The volatile memory may include, for example, a random access memory (RAM) and/or a cache, and the like. The non-volatile memory may include, for example, a read only memory (ROM), a hard disk, an erasable programmable read only memory (EPROM), a portable compact disk read only memory (CD-ROM), a USB memory, a flash memory, and the like. One or more computer program modules may be stored on the storage medium, and in a case where the one or more computer program modules are executed, one or more steps in the acceleration processing method 500 may be implemented. Various application programs and various data as well as various data used and/or generated by the application programs may also be stored in the storage medium.

At least one embodiment of the present disclosure also provides an electronic device, which includes one or more processors, and the processors are configured to execute a computer instruction to perform one or more steps in the acceleration processing method 500.

For example, the processor may be a central processing unit (CPU), a digital signal processor (DSP), or other forms of processing units having data processing capability and/or program execution capability, such as a field programmable gate array (FPGA) or the like. For example, the central processing unit (CPU) may be X86 or ARM architecture or the like. The processor may be a general-purpose processor or a special-purpose processor, and may execute a computer instruction to perform one or more steps in the acceleration processing method 500.

What are described above is related to specific embodiments of the disclosure only and not limitative to the scope of the disclosure; and changes or substitutions, which may be easily thought of by those familiar with this art, within the technical scope of the present disclosure, should be covered within the scope of protection of the present disclosure. Therefore, the scope of protection of the disclosure is defined by the accompanying claims.

What is claimed is:

1. A capacitance detection circuit for monitoring a capacitance value of a capacitor of an acceleration sensor, wherein the acceleration sensor comprises:
    a base;
    at least one fixed electrode fastened on the base; and
    at least one mass, movable relative to the fixed electrode,
        wherein the mass comprises a conductive electrode, the conductive electrode and the fixed electrode are configured to form the capacitor, and the capacitance value of the capacitor is variable due to movement of the mass relative to the base,
        wherein an overlapping area of an orthographic projection of the conductive electrode and an orthographic projection of the fixed electrode is variable, the orthographic projection of the conductive electrode is a projection of the conductive electrode on a surface of the base along a direction perpendicular to the base, and the orthographic projection of the fixed electrode is a projection of the fixed electrode on the surface of the base along the direction perpendicular to the base,
    wherein the capacitance detection circuit comprises:
        a first capacitor and a detection sub-circuit,
        wherein two terminals of the first capacitor are electrically connected to the fixed electrode and the conductive electrode of the acceleration sensor, respectively, and
        the detection sub-circuit is configured to convert a capacitance value of the first capacitor into a detection signal and output the detection signal,
        wherein the detection sub-circuit comprises: a first switch, a second switch, a third switch, a second capacitor, a resistor, a generation sub-circuit and a storage sub-circuit,
        wherein the first capacitor is configured to:
            charge in response to a case where the first switch is turned on, and
            discharge in response to a case where the first switch is turned off and the second switch and the third switch both are turned on, and charge the second capacitor,
        wherein the generation sub-circuit is configured to generate the detection signal according to a voltage of the second capacitor and a reference voltage, the detection signal generated is at a first level in a case where the voltage of the second capacitor is lower than the reference voltage, and the detection signal generated is at a second level in a case where the voltage of the second capacitor is not lower than the reference voltage,
        wherein the second capacitor is configured to discharge through the resistor in response to a case where the detection signal is at the second level, and
        wherein the storage sub-circuit is configured to buffer and output the detection signal.

2. The capacitance detection circuit according to claim 1, wherein the detection sub-circuit further comprises:
    a first inverter, configured to invert a clock signal input from a clock signal terminal and output an inversion signal of the clock signal to a control electrode of the first switch; and
    a second inverter, configured to invert the detection signal and output an inversion signal of the detection signal to a control electrode of the third switch, so that the third switch is turned on in a case where the detection signal is at the first level.

3. The capacitance detection circuit according to claim 2, wherein the detection sub-circuit further comprises:
    a fourth switch, configured to be turned on in response to the case where the detection signal is at the second level, so that the second capacitor discharges through the resistor.

4. The capacitance detection circuit according to claim 3, wherein an input terminal of the first inverter is connected to the clock signal terminal, and an output terminal of the first inverter is connected to the control electrode of the first switch;
an input terminal of the second inverter is connected to an output terminal of the generation sub-circuit, and an output terminal of the second inverter is connected to the control electrode of the third switch;
a first electrode of the first switch is connected to a first power supply terminal for receiving a first voltage that is input, and a second electrode of the first switch is connected to a first terminal of the first capacitor;
a second terminal of the first capacitor is grounded;
a control electrode of the second switch is connected to the clock signal terminal for receiving the clock signal, a first electrode of the second switch is connected to the first terminal of the first capacitor, and a second electrode of the second switch is connected to a first terminal of the second capacitor;
a first electrode of the third switch is connected to a second terminal of the second capacitor, and a second electrode of the third switch is connected to the second terminal of the first capacitor; and
a control electrode of the fourth switch is connected to the output terminal of the generation sub-circuit, a first electrode of the fourth switch is connected to a first terminal of the resistor, and a second electrode of the fourth switch is connected to the second terminal of the second capacitor.

5. The capacitance detection circuit according to claim 1, wherein the detection signal comprises a square wave signal, and
a number of pulses of the square wave signal and an acceleration of the acceleration sensor are in a linear relationship.

6. A capacitance detection method for the capacitance detection circuit according to claim 1, comprising:
charging the first capacitor;
repeating operations of charging and discharging until electric charges of the first capacitor are discharged completely, wherein the operations of charging and discharging comprise:
charging the second capacitor by discharging the first capacitor, and
discharging the second capacitor;
generating the detection signal according to a voltage of the second capacitor and the reference voltage, wherein the detection signal generated is at the first level in the case where the voltage of the second capacitor is lower than the reference voltage, and the detection signal generated is at the second level in the case where the voltage of the second capacitor is not lower than the reference voltage; and
buffering and outputting the detection signal.

7. An acceleration processing circuit, comprising the capacitance detection circuit according to claim 1, an acceleration calculation sub-circuit, and a processing sub-circuit;
wherein the capacitance detection circuit is configured to output the detection signal to the acceleration calculation sub-circuit;
the acceleration calculation sub-circuit is configured to calculate a correlation parameter value of an acceleration according to the detection signal; and
the processing sub-circuit is configured to perform an operation corresponding to the correlation parameter value of the acceleration, according to the correlation parameter value of the acceleration.

8. The acceleration processing circuit according to claim 7, wherein the correlation parameter value and an acceleration measured by the acceleration sensor are in a linear relationship.

9. An acceleration processing method for the acceleration processing circuit according to claim 7, comprising:
monitoring the capacitor in the acceleration sensor and converting a monitoring result into the detection signal;
calculating the correlation parameter value of the acceleration according to the detection signal; and
performing the operation corresponding to the correlation parameter value of the acceleration, according to the correlation parameter value of the acceleration.

10. The acceleration processing method according to claim 9, wherein the detection signal is a square wave signal,
the calculating the correlation parameter value of the acceleration according to the detection signal comprises: counting a number of pulses of the square wave signal during a predetermined time period, and
the performing the operation corresponding to the correlation parameter value of the acceleration, according to the correlation parameter value of the acceleration, comprises:
determining whether the number of the pulses is less than a preset threshold value; and
performing the operation in a case where the number of the pulses is less than the preset threshold value.

11. A non-volatile storage medium on which a computer instruction is stored, wherein one or more steps of the acceleration processing method according to claim 9 are performed in a case where the computer instruction is executed by a processor.

12. An electronic device, comprising one or more processors, the processors being configured to execute a computer instruction for performing one or more steps of the acceleration processing method according to claim 9.

* * * * *